US011924897B2

(12) United States Patent
Akl et al.

(10) Patent No.: US 11,924,897 B2
(45) Date of Patent: Mar. 5, 2024

(54) RESOURCE REPORTING FOR INTEGRATED ACCESS AND BACKHAUL RADIO ACCESS DUAL CONNECTIVITY

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/447,512

(22) Filed: Sep. 13, 2021

(65) Prior Publication Data

US 2022/0086936 A1 Mar. 17, 2022

Related U.S. Application Data

(60) Provisional application No. 63/078,171, filed on Sep. 14, 2020.

(51) Int. Cl.
*H04W 76/15* (2018.01)
(52) U.S. Cl.
CPC .................. *H04W 76/15* (2018.02)
(58) Field of Classification Search
CPC ...... H04W 76/15; H04W 72/27; H04W 36/08
See application file for complete search history.

(56) References Cited

U.S. PATENT DOCUMENTS

2019/0349079 A1* 11/2019 Novlan ............ H04B 7/15542
2021/0298000 A1*  9/2021 Park ...................... H04W 72/27
(Continued)

FOREIGN PATENT DOCUMENTS

WO   WO-2020033965 A1   2/2020
WO   WO-2020086316 A1   4/2020
WO   WO-2020091638 A1   5/2020

OTHER PUBLICATIONS

3GPP TR 38.874: "3rd Generation Partnership Project, Technical Specification Group Radio Access Network, NR, Study on Integrated Access and Backhaul, (Release 16)", 3GPP Draft, 38874-G00, 38.874, V16.0.0 (Dec. 2018), 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, Dec. 2018, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN%5F82/38874%2Dg00%2Ezip [retrieved on Jan. 11, 2019] paragraph [07. 3]—paragraph [8.2.7], Section 9.7, Cited in the Application, Paragraph 6.1.1 Abstract Section 6.2 IAB Architectures Proposed, p. 13-p. 17 Section 9.7 Topology Adaptation, p. 76-p. 86, 9.2 IAB Topologies, 9.3 Integration of IAB-node, 9.4 Modifications to CU/DU Architecture, 9.4.1 Modifications of IAB-donor/IAB-node, DU and IAB-Donor CU for Architecture Group, 172, p. 64-p. 72, Paragraph 7.3.1, paragraph 7.5.

(Continued)

*Primary Examiner* — Gary Mui
(74) *Attorney, Agent, or Firm* — Arun Swain

(57) ABSTRACT

Various aspects of the present disclosure generally relate to wireless communication. In some aspects, a first network node may receive, from a first integrated access and backhaul (IAB) donor central unit (CU), information indicating a first resource configuration used by an IAB node that has a first connection with a first parent IAB node that is a child (Continued)

of the first IAB donor CU. The first network node may transmit, to a second parent IAB node that is a child of the first network node, the information. Numerous other aspects are described.

30 Claims, 10 Drawing Sheets

(56) References Cited

U.S. PATENT DOCUMENTS

| | | | |
|---|---|---|---|
| 2022/0046637 A1* | 2/2022 | Abedini | H04W 8/24 |
| 2022/0086660 A1* | 3/2022 | Akl | H04W 24/02 |
| 2022/0086695 A1* | 3/2022 | Akl | H04L 41/0823 |
| 2022/0086718 A1* | 3/2022 | Akl | H04W 36/08 |
| 2022/0086829 A1* | 3/2022 | Akl | H04B 7/15542 |
| 2022/0174668 A1* | 6/2022 | Yuan | H04L 1/1812 |
| 2022/0182977 A1* | 6/2022 | Miao | H04W 72/51 |
| 2022/0278741 A1* | 9/2022 | Dahlman | H04B 7/15542 |
| 2022/0279511 A1* | 9/2022 | Kowalski | H04W 72/20 |
| 2022/0345285 A1* | 10/2022 | You | H04W 72/53 |
| 2022/0394679 A1* | 12/2022 | Liu | H04W 72/04 |
| 2023/0079311 A1* | 3/2023 | Jayasinghe Laddu | H04W 72/04 370/329 |
| 2023/0117298 A1* | 4/2023 | Park | H04W 72/044 370/281 |

OTHER PUBLICATIONS

International Search Report and Written Opinion—PCT/US2021/071446—ISA/EPO—dated Dec. 23, 2021.
3GPP RAN3, "LS on IAB Resource Multiplexing", R3-212974, 3GPP TSG-RAN WG3#112-e, E-Meeting, May 17-27, 2021, 2 pages.

* cited by examiner

US 11,924,897 B2

RESOURCE REPORTING FOR INTEGRATED ACCESS AND BACKHAUL RADIO ACCESS DUAL CONNECTIVITY

CROSS-REFERENCE TO RELATED APPLICATION

This Patent Application claims priority to U.S. Provisional Patent Application No. 63/078,171, filed on Sep. 14, 2020, entitled "RESOURCE REPORTING FOR INTEGRATED ACCESS AND BACKHAUL RADIO ACCESS DUAL CONNECTIVITY," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for resource reporting for integrated access and background radio access dual connectivity.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for communication at a first network node. The apparatus may include a memory and one or more processors coupled to the memory. The one or more processors may be configured to receive, from a first integrated access and backhaul (IAB) donor central unit (CU), information indicating a first resource configuration used by an IAB node that has a first connection with a first parent IAB node that is a child of the first IAB donor CU. The one or more processors may be further configured to transmit, to a second parent IAB node that is a child of the first network node, the information.

Some aspects described herein relate to an apparatus for communication at a first network node. The apparatus may include a memory and one or more processors coupled to the memory. The one or more processors may be configured to transmit, to a first IAB donor CU that is associated with a first parent IAB node, a request associated with an IAB node that has a first connection with a second parent IAB node that is a child of the first network node. The one or more processors may be further configured to transmit, to the first IAB donor CU, information indicating a first resource configuration used by the IAB node.

Some aspects described herein relate to a method of communication performed by a first network node. The method may include receiving, from a first IAB donor CU, information indicating a first resource configuration used by an IAB node that has a first connection with a first parent IAB node that is a child of the first IAB donor CU. The method may further include transmitting, to a second parent IAB node that is a child of the first network node, the information.

Some aspects described herein relate to a method of communication performed by a first network node. The method may include transmitting, to a first IAB donor CU that is associated with a first parent IAB node, a request associated with an IAB node that has a first connection with a second parent IAB node that is a child of the first network node. The method may further include transmitting, to the first IAB donor CU, information indicating a first resource configuration used by the IAB node.

Some aspects described herein relate to a non-transitory computer-readable medium that stores a set of instructions for communication by a first network node. The set of instructions, when executed by one or more processors of the first network node, may cause the first network node to receive, from a first IAB donor CU, information indicating a first resource configuration used by an IAB node that has a first connection with a first parent IAB node that is a child of the first IAB donor CU. The set of instructions, when executed by one or more processors of the first network node, may further cause the first network node to transmit, to a second parent IAB node that is a child of the first network node, the information.

Some aspects described herein relate to a non-transitory computer-readable medium that stores a set of instructions for communication by a first network node. The set of instructions, when executed by one or more processors of the first network node, may cause the first network node to transmit, to a first IAB donor CU that is associated with a first parent IAB node, a request associated with an IAB node that has a first connection with a second parent IAB node that is a child of the first network node. The set of instructions, when executed by one or more processors of the first network node, may further cause the first network node to transmit, to the first IAB donor CU, information indicating a first resource configuration used by the IAB node.

Some aspects described herein relate to an apparatus for communication. The apparatus may include means for receiving, from a first IAB donor CU, information indicating a first resource configuration used by an IAB node that has a first connection with a first parent IAB node that is a child of the first IAB donor CU. The apparatus may further include means for transmitting, to a second parent IAB node that is a child of the first network node, the information.

Some aspects described herein relate to an apparatus for communication. The apparatus may include means for transmitting, to a first IAB donor CU that is associated with a first parent IAB node, a request associated with an IAB node that has a first connection with a second parent IAB node that is a child of the first network node. The apparatus may further include means for transmitting, to the first IAB donor CU, information indicating a first resource configuration used by the IAB node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
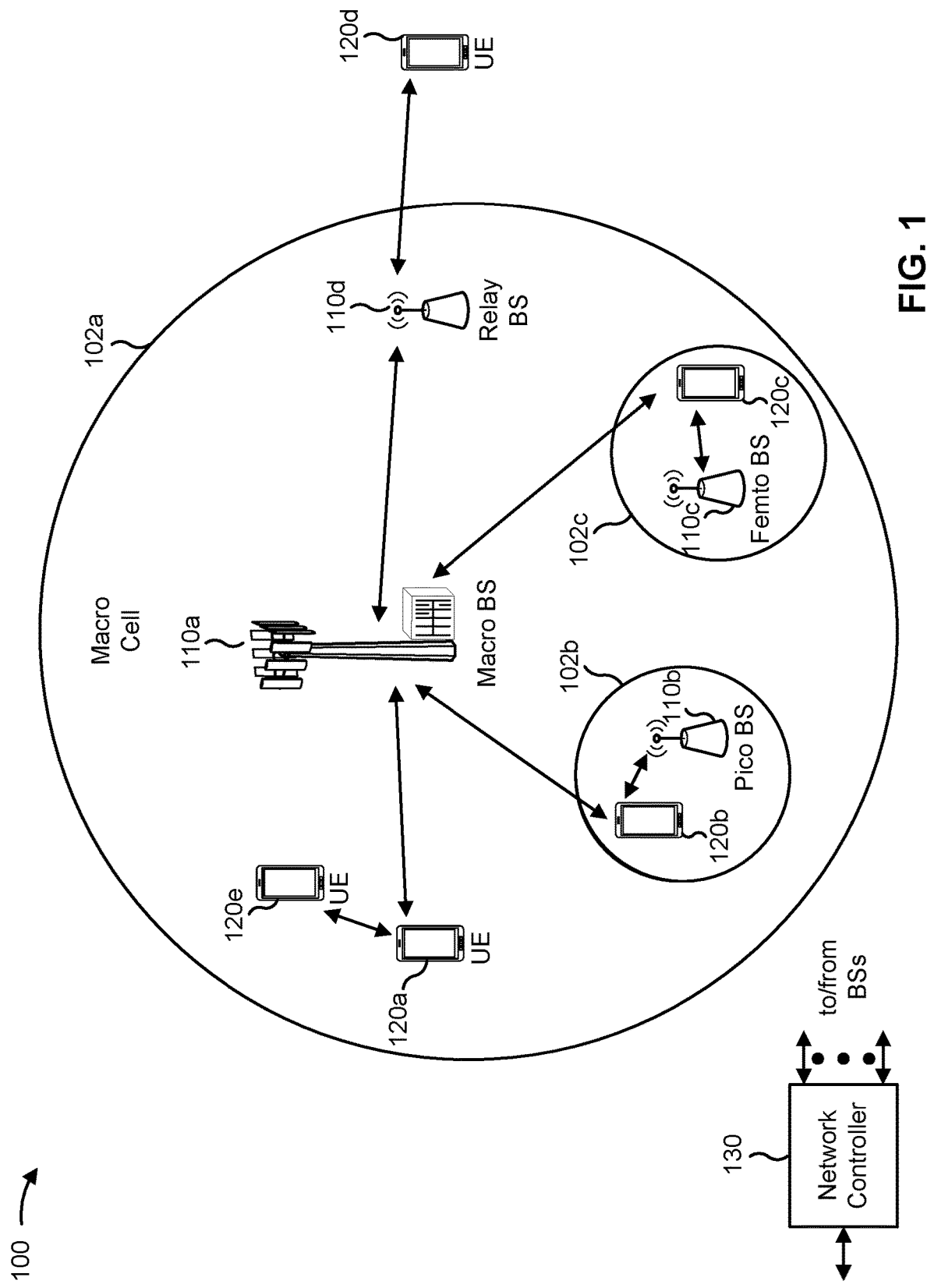
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
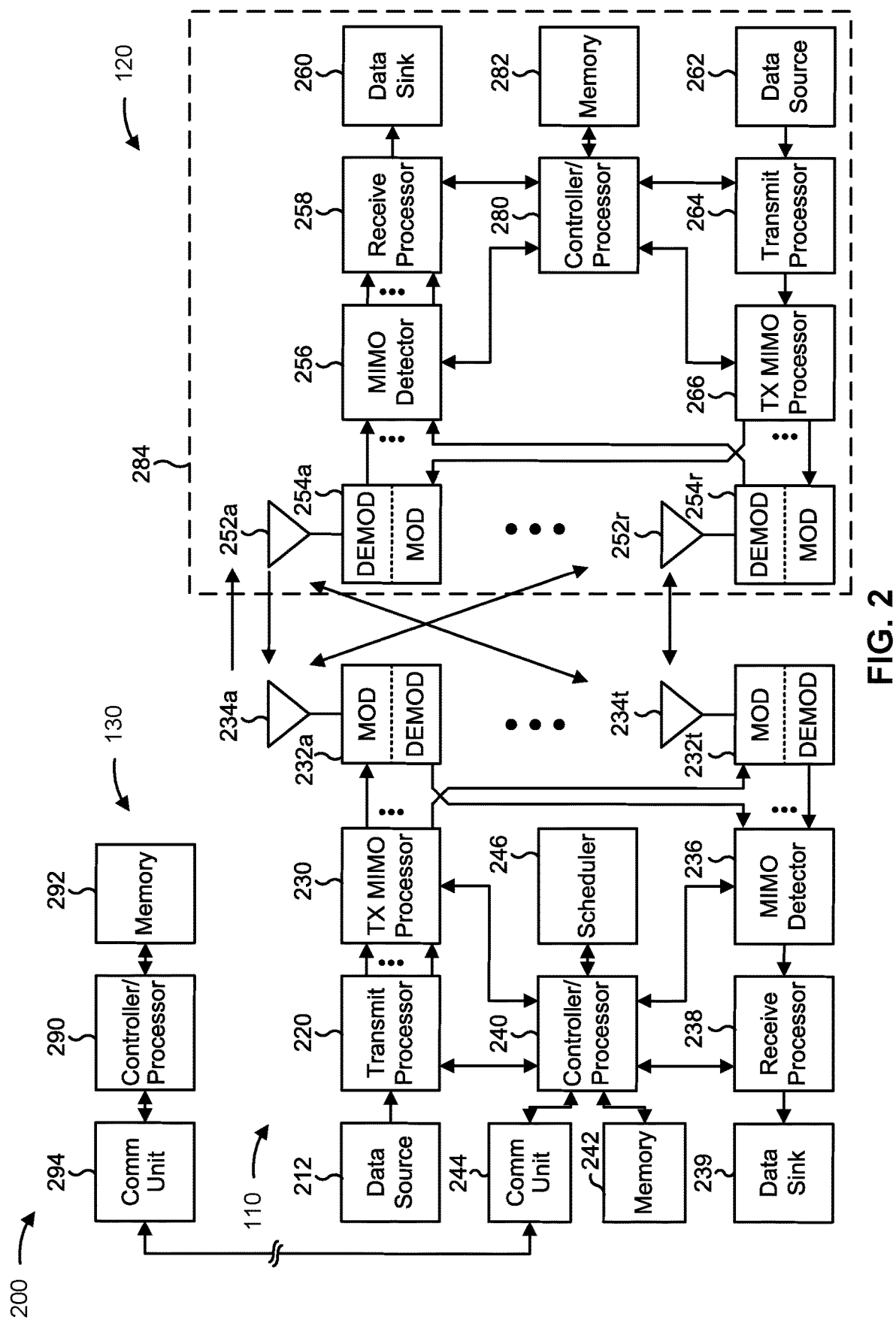
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-10).

The controller/processor 240 of the base station 110, the controller/processor 280 of the UE 120, and/or any other component(s) of FIG. 2 may perform one or more techniques associated with resource reporting for integrated access and backhaul (IAB) radio access dual connectivity, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples. In some aspects, the network node (e.g., an IAB central unit (CU) and/or an IAB distributed unit (DU)) described herein is the base station 110, is included in the base station 110, or includes one or more components of the base station 110 shown in FIG. 2.

In some aspects, a network node (e.g., IAB donor CU 705a of FIG. 7 and/or apparatus 1000 of FIG. 10) may include means for receiving, from a first IAB donor CU (e.g., IAB donor CU 705b of FIG. 7 and/or apparatus 1000 of FIG. 10), information indicating a first resource configuration used by an IAB node that has a first connection with a first parent IAB node that is a child of the first IAB donor CU; and/or means for transmitting, to a second parent IAB node that is a child of the first network node, the information. In some aspects, the means for the first network node to perform operations described herein may include, for example, one or more of transmit processor 220, TX MIMO processor 230, modem 232, antenna 234, MIMO detector 236, receive processor 238, controller/processor 240, memory 242, or scheduler 246.

In some aspects, a network node (e.g., IAB donor CU 705b of FIG. 7 and/or apparatus 1000 of FIG. 10) may include means for transmitting, to a first IAB donor CU (e.g., IAB donor CU 705a of FIG. 7 and/or apparatus 1000 of FIG. 10) that is associated with a first parent IAB node, a request associated with an IAB node that has a first connection with a second parent IAB node that is a child of the first network node; and/or means for transmitting, to the first IAB donor CU, information indicating a first resource configuration used by the IAB node. In some aspects, the means for the first network node to perform operations described herein may include, for example, one or more of transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
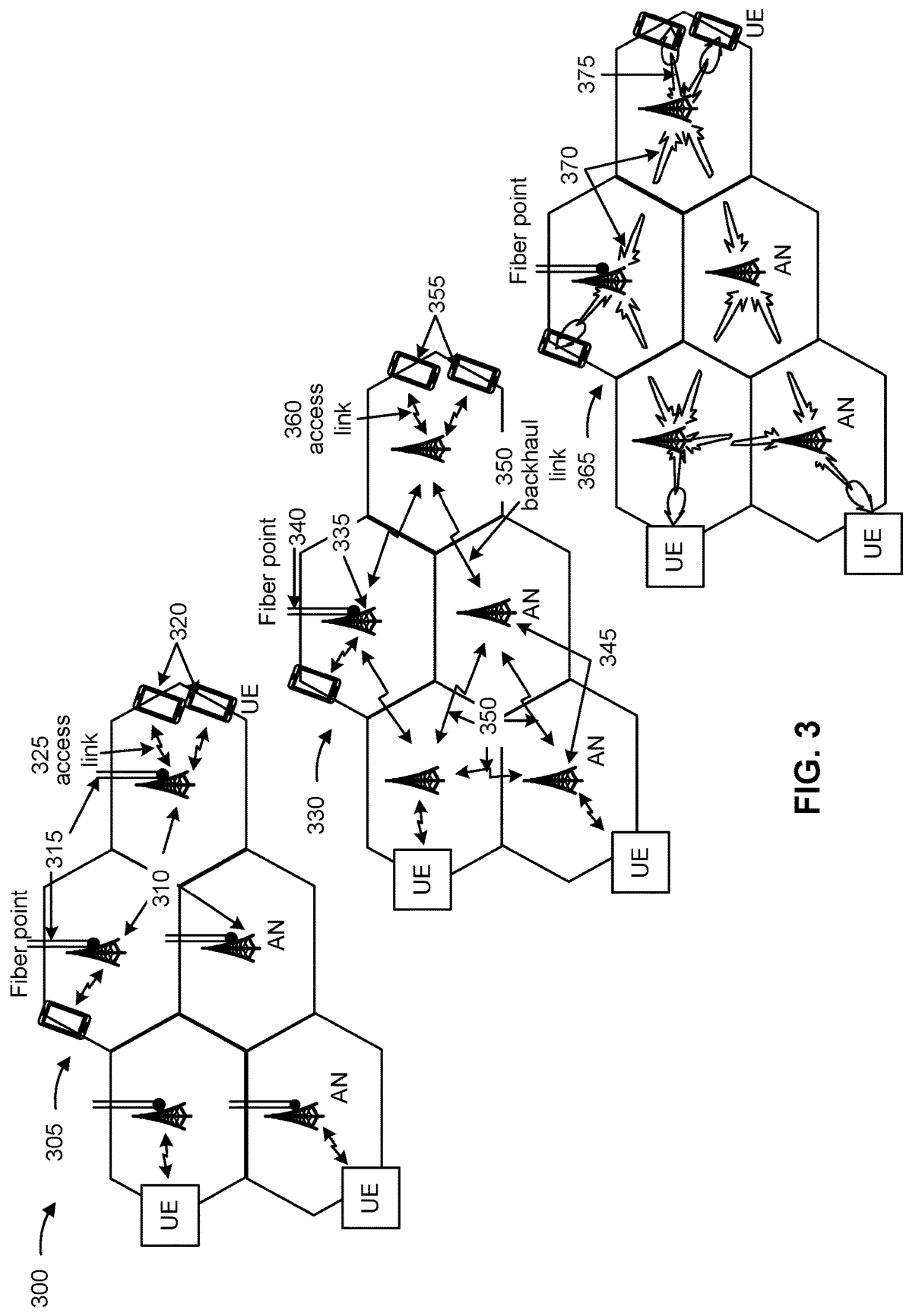
FIG. 3 is a diagram illustrating an example of radio access networks, in accordance with the present disclosure.

FIG. 3 is a diagram illustrating examples 300 of radio access networks, in accordance with the present disclosure. As shown by reference number 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB donor). The IAB network may include one or more non-anchor base stations 345, sometimes referred to as relay base stations or IAB nodes (or IAB nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
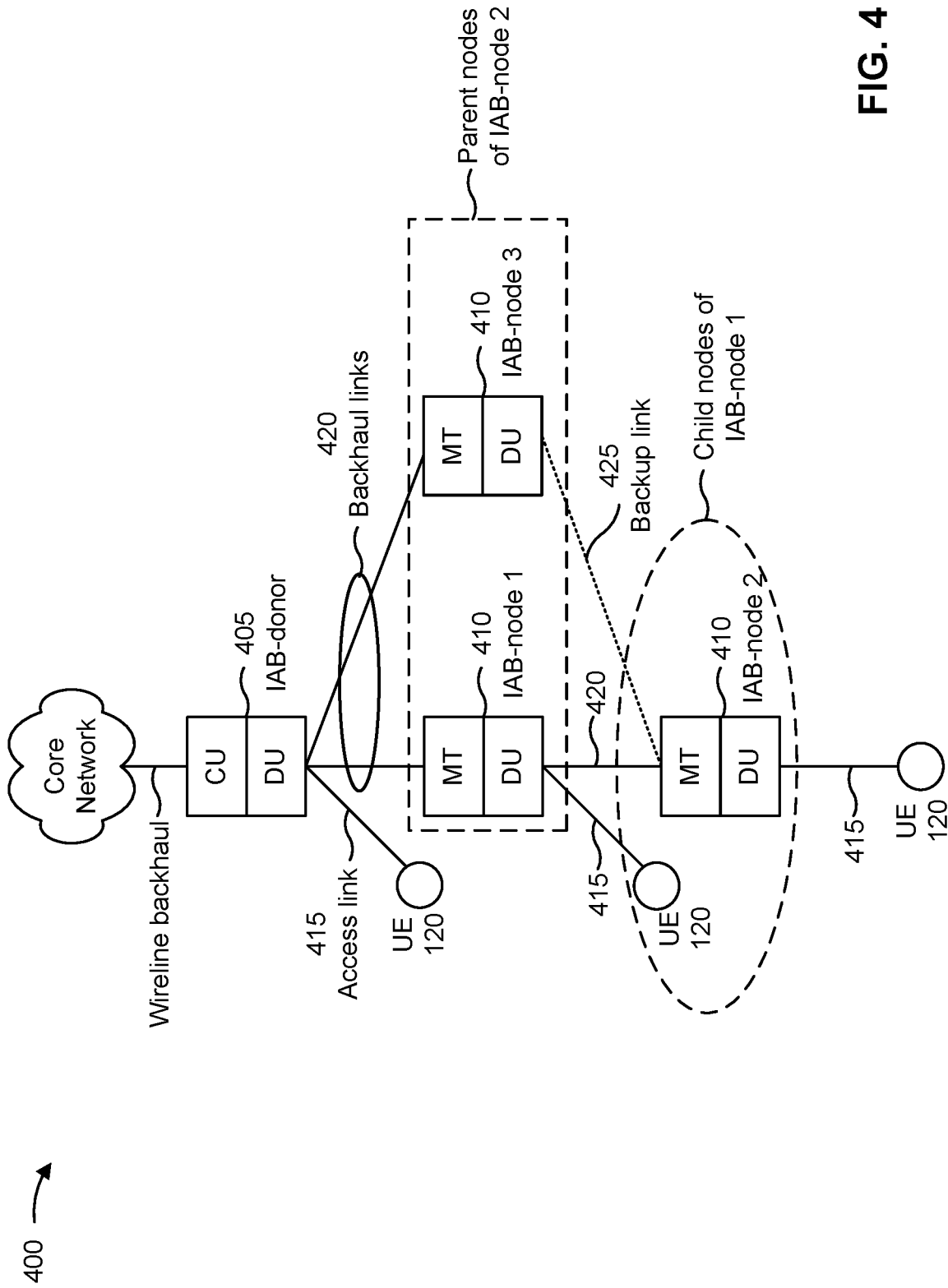
FIG. 4 is a diagram illustrating an example of integrated access and backhaul (IAB) network architecture, in accordance with the present disclosure.

FIG. 4 is a diagram illustrating an example 400 of an IAB network architecture, in accordance with the present disclosure. As shown in FIG. 4, an IAB network may include an IAB donor 405 (shown as IAB donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a CU, which may perform access node controller (ANC) functions and/or AMF functions. The CU may configure a DU of the IAB donor 405 and/or may configure one or more IAB nodes 410 (e.g., a mobile termination (MT) unit and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB node 1, IAB node 2, and IAB node 3) that connect to the core network via the IAB donor 405. As shown, an IAB node 410 may include MT functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB node 2 and IAB node 3 may be used for backhaul communications if a primary backhaul link between IAB node 2 and IAB node 1 fails. As used herein, a node or a wireless node may refer to an IAB donor 405 or an IAB node 410.

As indicated above, FIG. 4 is provided as an example. Other examples may differ from what is described with regard to FIG. 4.

Figure 5:
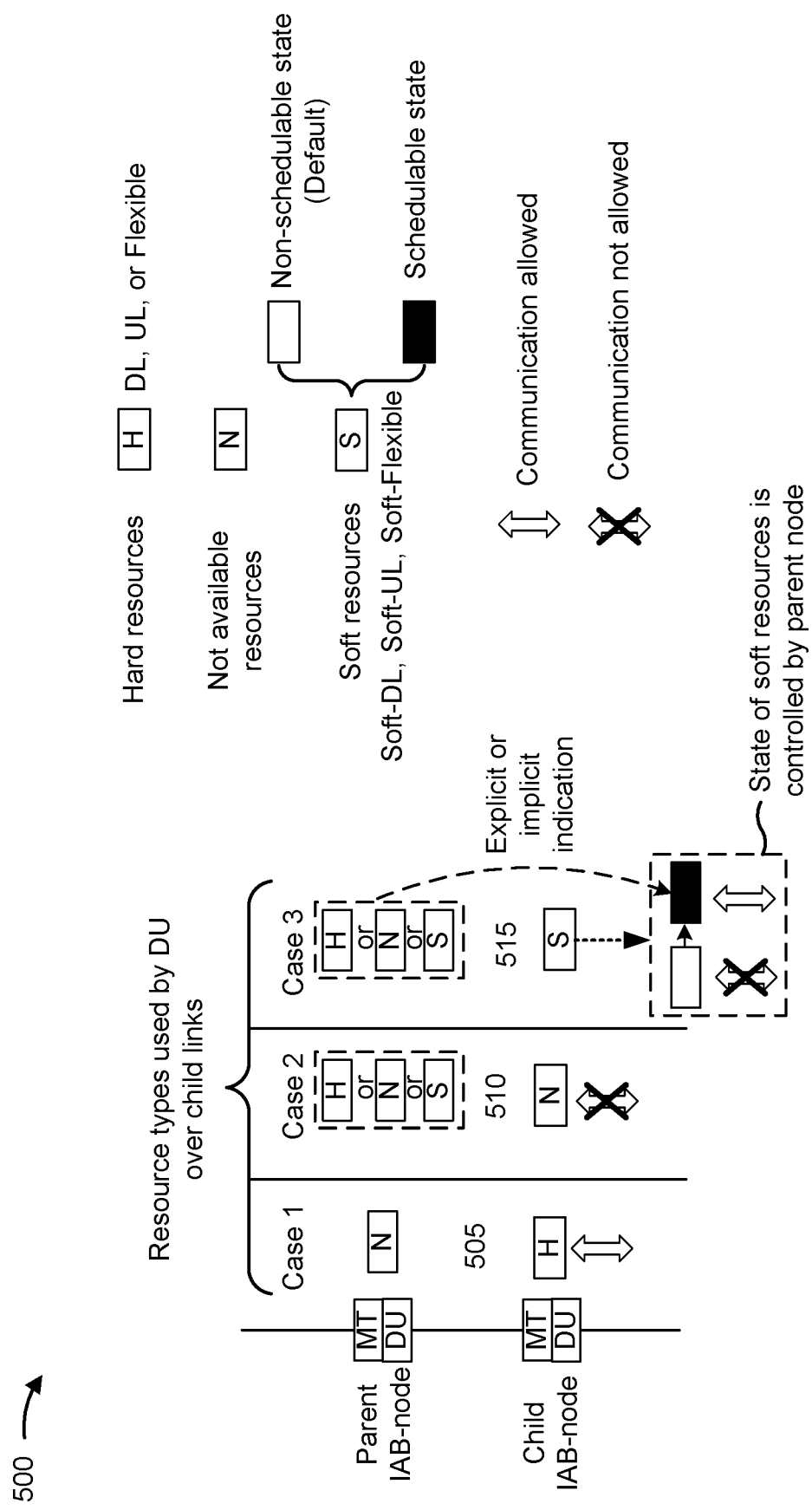
FIG. 5 is a diagram illustrating an example of resource types in an IAB network, in accordance with the present disclosure.

FIG. 5 is a diagram illustrating an example 500 of resource types in an IAB network, in accordance with the present disclosure. In an IAB network, time domain resources (sometimes referred to as time resources) may be configured as downlink-only, uplink-only, flexible, or not available (e.g., unavailable). When a time resource is configured as downlink-only for a wireless node, that time resource may be available for only downlink communications of the wireless node, and not uplink communications. Similarly, when a time resource is configured as uplink-only for a wireless node, that time resource may be available for only uplink communications of the wireless node, and not downlink communications. When a time resource is configured as flexible for a wireless node, that time resource may be available for both downlink communications and uplink communications of the wireless node. When a time resource is configured as not available for a wireless node, that time resource may not be used for any communications of the wireless node.

Examples of downlink communications include synchronization signal blocks (SSBs), channel state information reference signals (CSI-RSs), physical downlink control channel (PDCCH) communications, and/or physical downlink shared channel (PDSCH) communications. Examples of uplink communications include physical random access channel (PRACH) communications, physical uplink control channel (PUCCH) communications, physical uplink shared channel (PUSCH) communications, and/or sounding reference signals (SRSs).

Time resources in an IAB network that are configured as downlink-only, uplink-only, or flexible may be further configured as hard resources or soft resources. When a time resource is configured as a hard resource for a wireless node, that time resource is always available for communications of the wireless node. For example, a hard downlink-only time resource is always available for only downlink communications of the wireless node, a hard uplink-only time resource is always available for only uplink communications of the wireless node, and a hard flexible time resource is always available for uplink and downlink communications of the wireless node.

When a time resource is configured as a soft resource for a wireless node, the availability of that time resource is controlled by a parent node of the wireless node. For example, the parent node may indicate (e.g., explicitly or implicitly) whether a soft time resource is available for communications of the wireless node. Thus, a soft time resource may be in one of two states: a schedulable state (e.g., when the soft time resource is available for scheduling and/or communications of the wireless node) and a non-schedulable state (e.g., when the soft time resource is not available for scheduling and is not available for communications of the wireless node).

For example, a soft downlink-only time resource is only available for downlink communications of the wireless node when a parent node of the wireless node indicates that the soft downlink-only time resource is available. Similarly, a soft uplink-only time resource is only available for uplink communications of the wireless node when a parent node of the wireless node indicates that the soft uplink-only time resource is available. A soft flexible time resource is only available for uplink and downlink communications of the wireless node when a parent node of the wireless node indicates that the soft flexible time resource is available.

As an example, and as shown by reference number 505, a time resource may be configured as hard for a child node, and may be configured as not available for a parent node of the child node. In this case, the parent node cannot communicate using that time resource, but the child node can schedule communications in that time resource and/or communicate using that time resource. This configuration may reduce interference between the parent node and the child node and/or may reduce scheduling conflicts between the parent node and the child node.

As another example, and as shown by reference number 510, a time resource may be configured as not available for the child node, and may be configured as hard, soft, or not available for the parent node (e.g., depending on a network configuration, network conditions, and/or a configuration of a parent node of the parent node). In this case, the child node cannot schedule communications in that time resource and cannot communicate using that time resource.

As another example, and as shown by reference number 515, a time resource may be configured as soft for the child node, and may be configured as hard, soft, or not available for the parent node (e.g., depending on a network configuration, network conditions, and/or a configuration of a parent node of the parent node). In this case, the child node cannot schedule or communicate using the time resource unless the child node receives an indication (e.g., a release indication), from the parent node (e.g., explicitly or implicitly), that the time resource is available (i.e., released) for use by the child node. If the child node receives such an indication, then the child node can schedule communications in that time resource and/or communicate using that time resource.

As indicated above, FIG. 5 is provided as an example. Other examples are possible and may differ from what was described with regard to FIG. 5.

Figure 6:
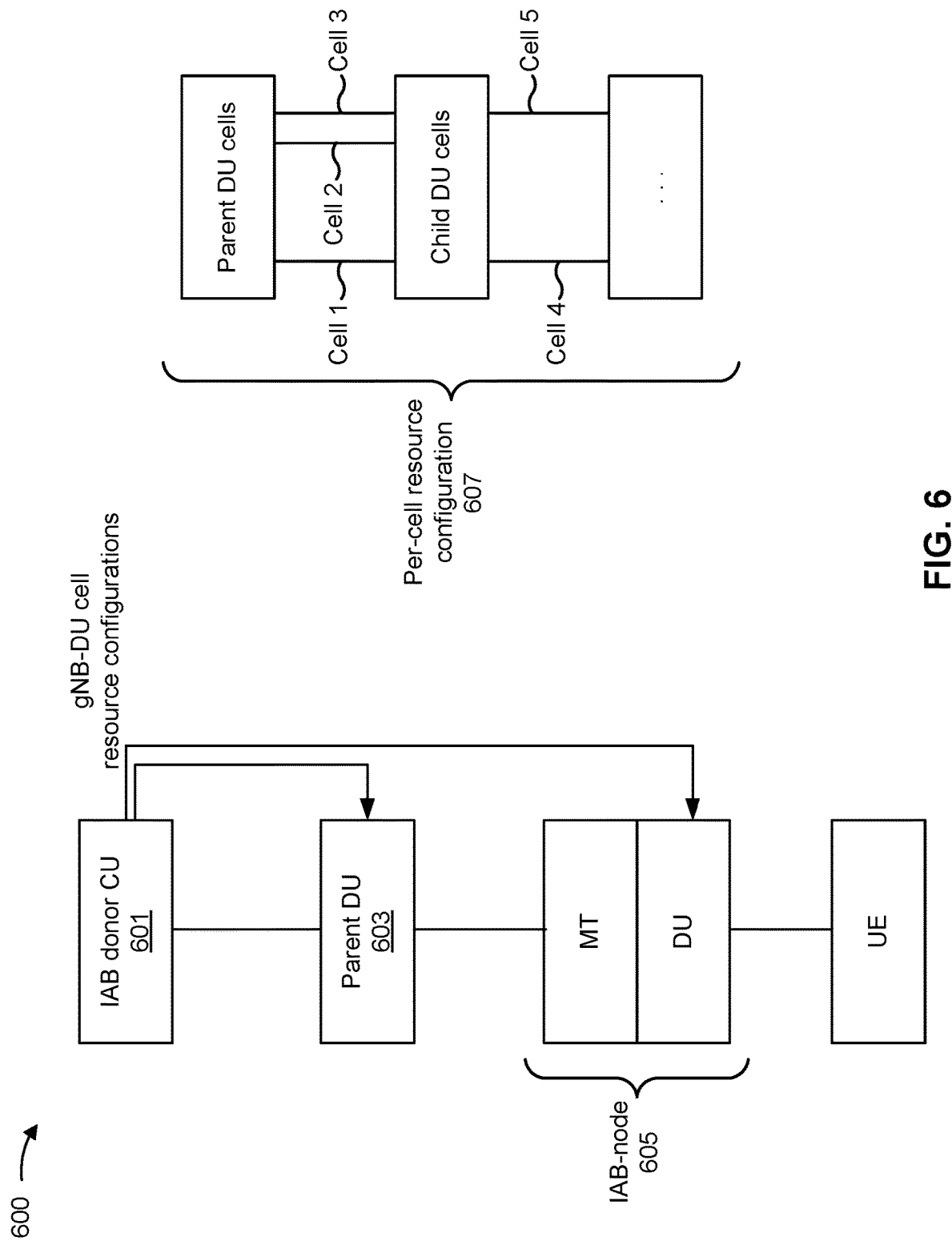
FIG. 6 is a diagram illustrating an example of distributed unit (DU) cell resource configuration for an IAB network, in accordance with the present disclosure.

FIG. 6 is a diagram illustrating an example 600 of DU cell resource configuration for an IAB network, in accordance with the present disclosure. Example 600 includes an IAB donor CU 601. The IAB donor CU 601 may be associated with a gNB (e.g., gNB 110). The IAB donor CU 601 may handle resource configuration for a parent DU 603 and an IAB node 605. Thus, the IAB donor CU 601 may accommodate half-duplex constraints of the parent DU 603, the IAB node 605, and/or other nodes of the IAB network.

The IAB donor CU 601 may provide a resource configuration via a cell resource configuration, shown as "gNB-DU cell resource configuration." In some aspects, as shown by reference number 607, the cell resource configuration may be specific to a cell. For example, the IAB donor CU 601 may provide a respective cell resource configuration for each cell served by a DU (e.g., the parent DU 603). The cell resource configuration may indicate at least part of the information described in connection with FIG. 5.

The term "cell" may refer to a logical communication entity used for communication with a base station (e.g., over a carrier), and may be associated with an identifier for distinguishing neighboring cells operating via the same or a different carrier. In some examples, the cells may support different service and/or device types (e.g., MTC, NB-IoT, enhanced mobile broadband (eMBB), ultra-reliable low-latency (URLLC) communications, and others). In some cases, the term "cell" may refer to a portion of a geographic coverage area (e.g., a sector) over which the logical entity operates. A cell may be referred to as "served by" a DU if the DU handles scheduling for communications via the cell.

A cell may be associated with a cell global identifier (CGI), such as an NR CGI (NCGI). The NCGI uniquely identifies a cell. The NCGI includes a public land mobile network (PLMN) identifier and an NR cell identifier. The PLMN identifier (which may include 24 bits) may include a mobile country code (MCC) (e.g., 12 bits) and a mobile network code (MNC) (e.g., 12 bits). The NCI (e.g., 36 bits in 5G) may include a gNB identifier (e.g., a leftmost 22 to 32 bits) and a local cell identifier (e.g., remaining bits of the NCI). The gNB identifier may be unique within a gNB, and may be common for all cells (e.g., all IAB donor DUs and all IAB node DUs) served by the gNB with one IAB donor CU. Equivalently, the PLMN and gNB ID may globally identify a gNB.

In some situations, an IAB node may be associated with DUs that are associated with two or more different CUs. Accordingly, a cell associated with a first CU may cause interference with a cell associated with a second CU. For example, an IAB node may be dual connected to a plurality of DUs and may be associated with two or more CUs. Additionally, the IAB node may have one or more DUs and serve one or more cells. Thus, if multiple IAB donor CUs do not coordinate resource configurations for an IAB node that is dual connected and has one or more DUs and serves one or more cells, the IAB donor CUs may provide cell resource configurations that cause interference between the one or more cells as well as between the dual connections with the plurality of DUs. Such interference diminishes throughput, increases chances of radio link failure, and relies on aggressive interference mitigation, which consumes power, processing resources, and network overhead.

Some techniques and apparatuses described herein provide signaling that enables a first IAB donor CU to coordinate, with a second IAB donor CU, resource configurations for an IAB node that is dual connected to DUs that are associated with the first and second IAB donor CUs. Thus, the IAB donor CUs can provide cell resource configurations that take into account the dual connectivity. By providing cell resource configurations that take into account the dual connectivity, the IAB donor CUs reduce interference and, as a result, increase throughput, reduce changes of radio link failure, and conserver power, processing resources, and network overhead that would otherwise be wasted on interference mitigation.

As indicated above, FIG. 6 is provided as an example. Other examples are possible and may differ from what was described with regard to FIG. 6.

Figure 7:
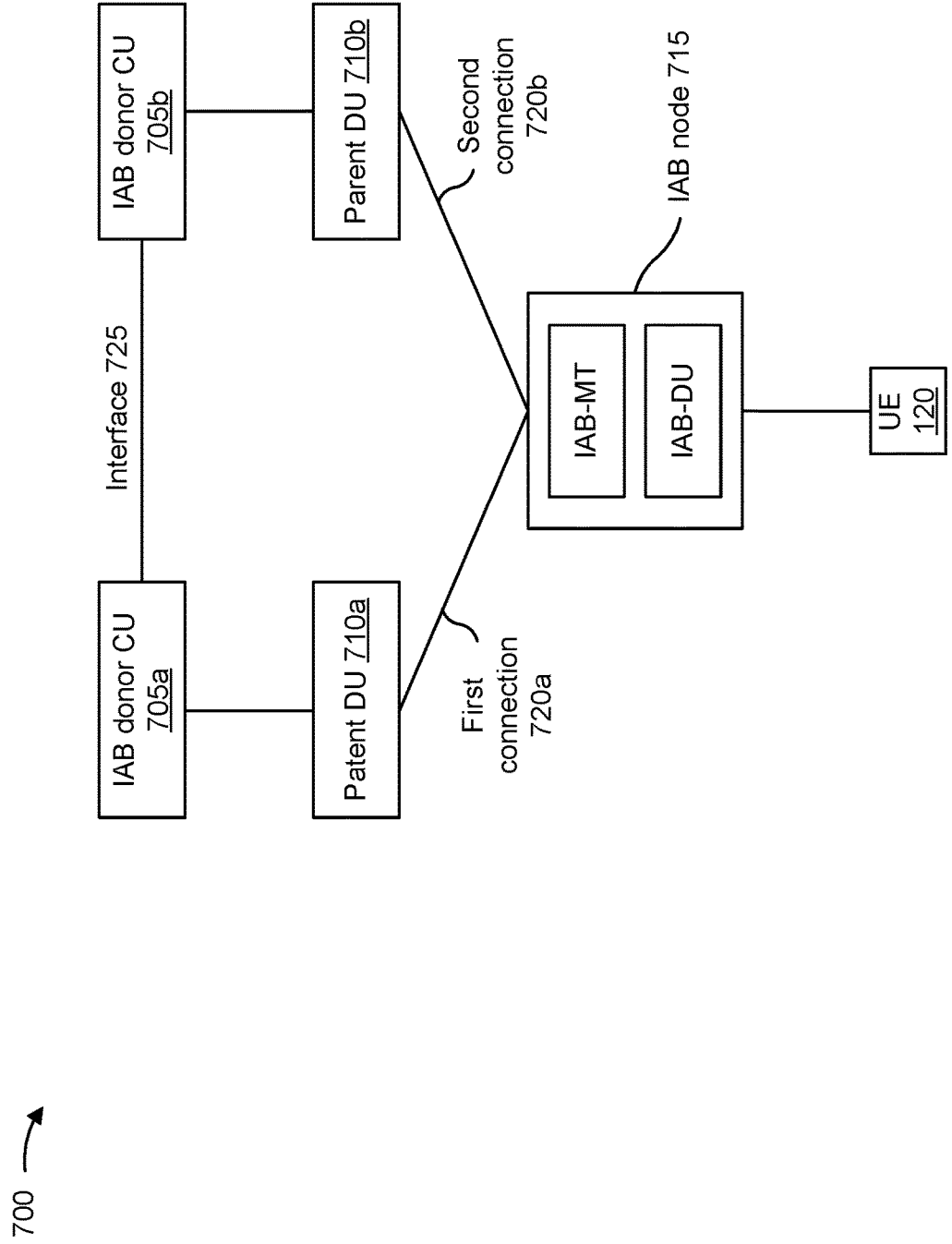
FIG. 7 is a diagram illustrating an example associated with resource reporting for IAB radio access dual connectivity, in accordance with the present disclosure.

FIG. 7 is a diagram illustrating an example 700 associated with resource reporting for IAB radio access dual connectivity, in accordance with the present disclosure. As shown in FIG. 7, example 700 includes communication between two network nodes, which may be a first IAB donor CU 705*a* and a second IAB donor CU 705*b*. Although the description focuses on IAB donor CUs, the description similarly applies to other network nodes, such as IAB donor DUs and/or base stations, among other examples.

As further shown in FIG. 7, the first IAB donor CU 705*a* may support a parent DU 710*a*. The IAB donor CU 705*a* may also be referred to as an "F1-terminating donor" that supports "parent node 1," which is the DU 710*a*. The parent DU 710*a* may have one or more child IAB nodes, such as IAB node 715. As shown in FIG. 7, the IAB node 715 may include an MT unit (also referred to as an IAB-MT) and a DU (also referred to as an IAB-DU). Similarly, the second IAB donor CU 705*b* may support a parent DU 710*b*. The IAB donor CU 705*b* may also be referred to as a "non-F1-terminating donor" that supports "parent node 2," which is the DU 710*b*.

The IAB node 715 may have a first connection 720*a* with the parent DU 710*a* supported by the first IAB donor CU 705*a*. The first connection 720*a* may also be referred to as "parent link 1" between the parent node 1 and "child node," which is the IAB node 715. The first connection 720*a* may be associated with a first cell having a first cell resource configuration assigned by the first IAB donor CU 705*a*. As further shown in FIG. 7, the first IAB donor CU 705*a* and the second IAB donor CU 705*b* may communicate on interface 725 (e.g., an Xn interface and/or another similar interface).

In example 700, the first IAB donor CU 705*a* and the second IAB donor CU 705*b* may coordinate to establish second connection 720*b* between the IAB node 715 and the parent DU 710*b* supported by the second IAB donor CU 705*b*. The second connection 720*b* may also be referred to as "parent link 2" between the parent node 2 and "child node," which is the IAB node 715. The second connection 720*b* may be associated with a second cell having a second cell resource configuration assigned by the second IAB donor CU 705*b*.

In example 700, the first IAB donor CU 705*a* may transmit, and the second IAB donor CU 705*b* may receive, information indicating a resource configuration used by the IAB node 715. For example, the first IAB donor CU 705*a* may transmit the information using interface 725. In some aspects, the resource configuration may be used by the IAB node 715 on the first connection 720*a* and/or to communication with one or more UEs (e.g., UE 120) and/or with one or more child nodes (e.g., child IAB nodes). In some aspects, the second IAB donor CU 705*b* may transmit, and the first IAB donor CU 705*a* may receive, a request for the resource configuration such that the first IAB donor CU 705*a* transmits the information in response to the request. As an alternative, the first IAB donor CU 705*a* may transmit, and the second IAB donor CU 705*b* may receive, the request.

In some aspects, the resource configuration may indicate a union of resources used by the IAB node 715 for MT communications and resources used by the IAB node 715 for DU communications. DU communications may include communications with the one or more UEs (e.g., UE 120). For example, DU communications may include downlink communications to the one or more UEs (e.g., on a PDCCH, a PDSCH, and/or other downlink channels) as well as broadcast communications (e.g., reference signals, synchronization signals, and/or other broadcast or multicast signals and messages). MT communications may include communications with parent DUs (e.g., parent DU 710a and/or parent DU 710b).

As an alternative, the information may indicate one or more resources used by the IAB node 715 for MT communications separately from one or more resources used by the IAB node 715 for DU communications. In some aspects, the first IAB donor CU 705a may transmit, and the second IAB donor CU 705b may receive, the information indicating the resource configuration used by the IAB node 715 for MT communications; and the first IAB donor CU 705a may transmit, and the second IAB donor CU 705b may receive, separately from the information, additional information indicating the resource configuration used by the IAB node 715 for DU communications. In any of the aspects described above, the resource(s) used by the IAB node 715 for MT communications may at least partially overlap with the resource(s) used by the IAB node 715 for DU communications.

In some aspects, the resource configuration used by the IAB node 715 may include at least one time resource. For example, the least one time resource may include a frame, a half-frame, a subframe, a slot, a symbol, or a combination thereof. Additionally, or alternatively, the resource configuration used by the IAB node 715 may include at least one frequency resource. For example, the least one frequency resource may include a carrier, a bandwidth part, a resource block, or a combination thereof. Additionally, or alternatively, the resource configuration used by the IAB node 715 may include at least one spatial resource. For example, that least one spatial resource may include a beam direction, a synchronization signal area, or a combination thereof.

The resource configuration used by the IAB node 715 may be cell-specific or child-specific. For example, the resource configuration may be for a cell served by the IAB node 715 (e.g., the first cell as described above) or for a child of the IAB node 715 (e.g., another IAB node that is a child of the IAB node 715).

In some aspects, the information may include a cell resource configuration of a cell served by the IAB node 715 (e.g., the first cell as described above), a configuration of synchronization signal transmissions (e.g., SSB transmissions) associated with the cell, a CSI-RS configuration of the cell, a random access channel (RACH) configuration of the cell, a scheduling request (SR) configuration of the cell, a downlink channel (e.g., a PDCCH, a PDSCH, and/or other downlink channel) configuration for the cell, a subcarrier spacing (SCS) for transmissions of the cell, at least part of a system information message (e.g., a machine information block (MIB) message, a system information block (SIB) message, and/or other similar message) associated with the cell, or a combination thereof.

In some aspects, the information may further indicate a multiplexing capability associated with the IAB node 715. For example, the information may indicate whether the IAB node 715 is using half-duplexing, full-duplexing, and/or other multiplexing schemes for different communications. In some aspects, the multiplexing capability may include a multiplexing scheme between MT communications and DU communications of the IAB node 715. Additionally, or alternatively, the multiplexing capability may include a multiplexing scheme between communications on the second connection 720b and at least one of communications on the first connection 720a or DU communications of the IAB node 715.

In some aspects, the second IAB donor CU 705b may transmit, to a parent IAB node (e.g., parent DU 710b), the information indicating the resource configuration. The parent DU 710b may transmit, and the second IAB donor CU 705b may receive, an acknowledgement based at least in part on the information indicating the resource configuration. In some aspects, the acknowledgement may be based at least part on a multiplexing condition, between communications on the second connection 720b and at least one of communications on the first connection 720a or DU communications of the IAB node 715, being satisfied. For example, the acknowledgement may be based at least in part on an interference, between the communications on the second connection 720b and at least one of communications on the first connection 720a or DU communications of the IAB node 715, satisfying a threshold.

The second IAB donor CU 705b may transmit, and the first IAB donor CU 705a may receive, an acknowledgement based at least in part on the information. In some aspects, the second IAB donor CU 705b may transmit the acknowledgement to the first IAB donor CU 705a based at least in part on receiving an additional acknowledgement from the parent DU 710b (e.g., as described above).

As an alternative, the second IAB donor CU 705b may transmit, and the first IAB donor CU 705a may receive, a rejection of the second connection 720b. Accordingly, the IAB node 715 may maintain the first connection 720a and not establish the second connection 720b.

As an alternative, in some aspects, the first IAB donor CU 705a and/or the second IAB donor CU 705b may transmit additional communications to establish the second connection 720b. Additionally, or alternatively, the first IAB donor CU 705a and/or the second IAB donor CU 705b may modify at least one of the first connection 720a or the second connection 720b to accommodate the other of the first connection 720a or the second connection 720b.

In some aspects, the first IAB donor CU 705a may further transmit, and the second IAB donor CU 705b may receive, information indicating a cell resource configuration of a cell (e.g., a second cell) served by a parent IAB node (e.g., parent DU 710b) of the IAB node 715. Accordingly, the first IAB donor CU 705a may modify the cell resource configuration of the second cell to accommodate the second connection 720b. As used herein, "modifying" to accommodate the second connection 720b may include "matching" the configuration to a configuration associated with the second connection 720b. For example, the matching may include using a same H/SN pattern as described in connection with FIG. 5 (or at least a compatible pattern, e.g., where no unavailable resource is marked as available and no soft resource is marked as hard) and/or using a same time division duplex (TDD) pattern (or at least a compatible pattern, e.g., where no downlink resource is marked as uplink and no uplink resource is marked as downlink). Additionally, or alternatively, the parent DU 710b may establish an F1-C connection and/or other similar connection with the first IAB donor CU 705a and receive the information indicating a cell resource configuration of the second cell from the first IAB donor CU 705a.

In some aspects, the second IAB donor CU 705*b* may modify a cell resource configuration of a cell (e.g., a second cell) served by a parent IAB node (e.g., parent DU 710*b*) of the IAB node 715 based at least in part on the information indicating the resource configuration. Accordingly, the second IAB donor CU 705*b* may modify the cell resource configuration of the second cell to accommodate the second connection 720*b*. As used herein, "modifying" to accommodate the second connection 720*b* may include "matching" a configuration associated with the second connection 720*b* to the resource configuration indicated by the IAB donor CU 705*a*. For example, the matching may include using a same H/S/N pattern as described in connection with FIG. 5 (or at least a compatible pattern, e.g., where no unavailable resource is marked as available and no soft resource is marked as hard) and/or using a same TDD pattern (or at least a compatible pattern, e.g., where no downlink resource is marked as uplink and no uplink resource is marked as downlink).

Additionally, or alternatively, the second IAB donor CU 705*b* may transmit, and the first IAB donor CU 705*a* may receive, information indicating a resource configuration to be used by the IAB node 715 on the first connection 720*a* and/or information indicating a resource configuration to be used by the IAB node 715 on the second connection 720*b*. For example, the second IAB donor CU 705*b* may suggest a resource configuration for the first connection 720*a*. Additionally, or alternatively, the IAB donor CU 705*b* may indicate an intended resource configuration for the second connection 720*b*. Accordingly, in some aspects, the first IAB donor CU 705*a* may modify a cell resource configuration of a cell (e.g., the third cell) served by a parent IAB node (e.g., parent DU 710*a*) of the IAB node 715 based at least in part on the information indicating the resource configuration. Thus, the first IAB donor CU 705*a* may modify the cell resource configuration of the third cell to accommodate the second connection 720*b*.

In some aspects, the second IAB donor CU 705*b* may transmit, and the first IAB donor CU 705*a* may receive, information indicating a cell resource configuration of a cell (e.g., the first cell) served by the IAB node 715. Accordingly, the second IAB donor CU 705*b* may modify the cell resource configuration of the first cell to accommodate the second connection 720*b*. Additionally, or alternatively, the parent DU 710*a* may establish an F1-C connection and/or other similar connection with the second IAB donor CU 705*b* and receive the information indicating a cell resource configuration of the first cell from the second IAB donor CU 705*b*.

In some aspects, the second IAB donor CU 705*b* may transmit, and the first IAB donor CU 705*a* may receive, information indicating a cell resource configuration of a third cell served by a parent IAB node (e.g., parent DU 710*a*) of the IAB node 715. For example, the second IAB donor CU 705*b* may determine that the cell resource configuration of the third cell satisfies a multiplexing condition (e.g., as described above). Additionally, or alternatively, the parent DU 710*a* may establish an F1-C connection and/or other similar connection with the second IAB donor CU 705*b* and receive the information indicating the cell resource configuration of the third cell from the second IAB donor CU 705*b*.

The first IAB donor CU 705*a* and/or the second IAB donor CU 705*b* may transmit a message to trigger the second connection 720*b* between the IAB node 715 and the second IAB donor CU 705*b*. For example, the first IAB donor CU 705*a* may transmit a message to the second IAB donor CU 705*b* via interface 725 and/or to the parent DU 710*b* (e.g., via an F1-C connection) that triggers establishment of the second connection 720*b*. Additionally, or alternatively, the second IAB donor CU 705*b* may transmit a message to the parent DU 710*b* that triggers establishment of the second connection 720*b*. Additionally, or alternatively, the first IAB donor CU 705*a* may transmit (e.g., via parent DU 710*a*) and/or the second IAB donor CU 705*b* may transmit (e.g., via parent DU 710*b*) a message that triggers the IAB node 715 to establish the second connection 720*b*.

After triggering the second connection 720*b*, the second IAB donor CU 705*b* may transmit, and the first IAB donor CU 705*a* may receive, information indicating a resource configuration used by the IAB node 715 on the second connection 720*b* and/or a connection from the IAB node 715 to the UE 120 and/or to a child IAB node, of the IAB node 715, to which the UE 120 connects. Additionally, or alternatively, after triggering the second connection 720*b*, the first IAB donor CU 705*a* may transmit, and the second IAB donor CU 705*b* may receive, information indicating a resource configuration used by the IAB node 715 on the first connection 720*a* and/or the connection from the IAB node 715 to the UE 120 and/or to a child IAB node, of the IAB node 715, to which the UE 120 connects. Accordingly, the first IAB donor CU 705*a* and/or the second IAB donor CU 705*b* may further modify, after triggering the second connection 720*b*, a cell resource configuration associated with the first connection 720*a*, a cell resource configuration associated with the second connection 720*b*, a cell resource configuration associated with a cell served by the IAB node 715, a cell resource configuration associated with a connection to a child IAB node of the IAB node 715.

Although described with respect to occurring after the second connection 720*b* is triggered, the exchanges described above may alternatively occur before the second connection 720*b* is established or concurrently with a handshake between the first IAB donor CU 705*a* and the second IAB donor CU 705*b* that prepares establishment of the second connection 720*b*.

In some aspects, the first connection 720*a* may use an F1 control (F1-C) protocol, an RRC protocol, and/or other similar protocol. Similarly, the second connection 720*b* may use an F1-C protocol, an RRC protocol, and/or other similar protocol. The first connection 720*a* and the second connection 720*b* may use the same protocol or different protocols.

In some aspects, the IAB node 715 may use a dual connectivity mode to establish the first connection 720*a* and the second connection 720*b*. For example, the dual connectivity mode may include an evolved universal terrestrial radio access (E-UTRA) NR dual connectivity (EN-DC) mode, a next generation radio network (NG-RAN) E-UTRA NR dual connectivity (NGEN-DC) mode, an NR dual connectivity (NR-DC) mode, an NR E-UTRA dual connectivity (NE-DC) mode, and/or other similar dual connectivity mode.

Additionally, or alternatively, the IAB node 715 may use a dual-active protocol stack (DAPS) handover procedure to establish the first connection 720*a* and the second connection 720*b*. In some aspects, a DAPS handover procedure may be performed per radio bearer. Accordingly, for example, the IAB node 715 may use the DAPS handover procedure one bearer. Additionally, or alternatively, the IAB node 715 may use the DAPS handover procedure for a backhaul radio link connection (RLC) channel.

By using techniques as described in connection with FIG. 7, the first IAB donor CU 705*a* and the second IAB donor CU 705*b* exchange cell resource configurations that take into account dual connectivity on the first connection 720a and the second connection 720b as well as DU communications of the IAB node 715. Accordingly, the IAB donor CUs 705a and 705b increase throughput, reduce changes of radio link failure, and conserver power, processing resources, and network overhead that would otherwise be wasted on interference mitigation.

As indicated above, FIG. 7 is provided as an example. Other examples may differ from what is described with respect to FIG. 7.

Figure 8:
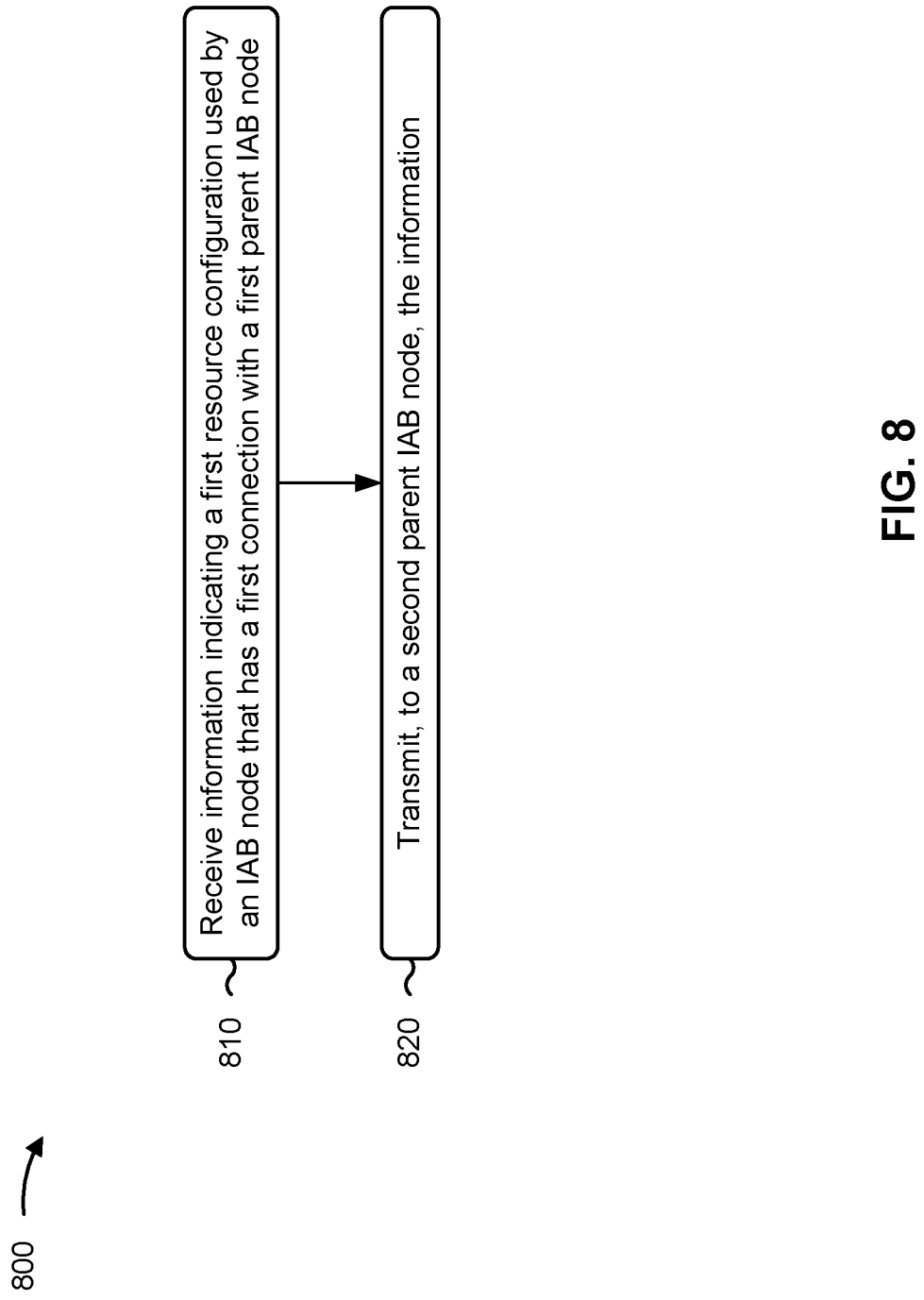
FIGS. 8 and 9 are diagrams illustrating example processes associated with resource reporting for IAB radio access dual connectivity, in accordance with the present disclosure.

FIG. 8 is a diagram illustrating an example process 800 performed, for example, by a first network node, in accordance with the present disclosure. Example process 800 is an example where the first network node (e.g., first IAB donor CU 705a of FIG. 7 and/or apparatus 1000 of FIG. 10) performs operations associated with resource reporting for integrated access and backhaul radio access dual connectivity.

As shown in FIG. 8, in some aspects, process 800 may include receiving, from a first IAB donor CU (e.g., second IAB donor CU 705b of FIG. 7 and/or apparatus 1000 of FIG. 10), information indicating a first resource configuration used by an IAB node (e.g., IAB node 715 of FIG. 7) that has a first connection with a first parent IAB node that is a child of the first IAB donor CU (block 810). For example, the first network node (e.g., using reception component 1002, depicted in FIG. 10) may receive, from a first IAB donor CU, information indicating a first resource configuration used by an IAB node that has a first connection with a first parent IAB node that is a child of the first IAB donor CU, as described herein.

As further shown in FIG. 8, in some aspects, process 800 may include transmitting, to a second parent IAB node that is a child of the first network node, the information (block 820). For example, the first network node (e.g., using transmission component 1004, depicted in FIG. 10) may transmit, to a second parent IAB node that is a child of the first network node, the information, as described herein.

Process 800 may include additional aspects, such as any single aspect or any combination of aspects described below and/or in connection with one or more other processes described elsewhere herein.

In a first aspect, the first network node includes a second IAB donor CU.

In a second aspect, alone or in combination with the first aspect, the IAB node includes an MT unit and a DU.

In a third aspect, alone or in combination with one or more of the first and second aspects, process 800 further includes transmitting (e.g., using transmission component 1004), to the first IAB donor CU, an acknowledgement that triggers a second connection between the IAB node and the second parent IAB node.

In a fourth aspect, alone or in combination with one or more of the first through third aspects, process 800 further includes determining (e.g., using determination component 1008, depicted in FIG. 10) that the first resource configuration is compatible with a second resource configuration used by the second parent IAB node, such that the acknowledgement is transmitted based at least in part on determining that the first resource configuration is compatible with the second resource configuration.

In a fifth aspect, alone or in combination with one or more of the first through fourth aspects, the IAB node uses a dual connectivity mode to establish the first connection and the second connection.

In a sixth aspect, alone or in combination with one or more of the first through fifth aspects, the first resource configuration indicates a union of resources used by the IAB node for MT communications and resources used by the IAB node for DU communications.

In a seventh aspect, alone or in combination with one or more of the first through sixth aspects, the first resource configuration indicates at least one resource used by the IAB node for MT communications.

In an eighth aspect, alone or in combination with one or more of the first through seventh aspects, the information further indicates a resource configuration used by the IAB node for DU communications, separately from the at least one resource used by the IAB node for MT communications.

In a ninth aspect, alone or in combination with one or more of the first through eighth aspects, the first resource configuration is for a cell served by the IAB node or for a child of the IAB node.

In a tenth aspect, alone or in combination with one or more of the first through ninth aspects, the information includes a cell resource configuration of a cell served by the IAB node, a configuration of synchronization signal transmissions associated with the cell, a channel state information reference signal configuration of the cell, a random access channel configuration of the cell, a scheduling request configuration of the cell, a downlink channel configuration for the cell, a subcarrier spacing for transmissions of the cell, at least part of a system information message associated with the cell, or a combination thereof.

In an eleventh aspect, alone or in combination with one or more of the first through tenth aspects, the information further indicates a multiplexing capability associated with the IAB node.

In a twelfth aspect, alone or in combination with one or more of the first through eleventh aspects, the multiplexing capability includes a multiplexing scheme between MT communications and DU communications of the IAB node.

In a thirteenth aspect, alone or in combination with one or more of the first through twelfth aspects, the multiplexing capability includes a multiplexing scheme between communications on a second connection between the IAB node and the second parent IAB node and at least one of communications on the first connection or DU communications of the IAB node.

In a fourteenth aspect, alone or in combination with one or more of the first through thirteenth aspects, process 800 further includes receiving (e.g., using reception component 1002), from the first IAB donor CU, information indicating a cell resource configuration of a cell served by the first parent IAB node of the IAB node.

In a fifteenth aspect, alone or in combination with one or more of the first through fourteenth aspects, process 800 further includes transmitting (e.g., using transmission component 1004), to the first IAB donor CU, information indicating a resource configuration to be used by the IAB node on a second connection with the second parent IAB node.

In a sixteenth aspect, alone or in combination with one or more of the first through fifteenth aspects, process 800 further includes transmitting (e.g., using transmission component 1004), to the first IAB donor CU, information indicating a resource configuration to be used by the IAB node on the first connection.

In a seventeenth aspect, alone or in combination with one or more of the first through sixteenth aspects, process 800 further includes receiving (e.g., using reception component 1002), from the first IAB donor CU, information indicating a resource configuration to be used by the IAB node on a second connection with the second parent IAB node.

In an eighteenth aspect, alone or in combination with one or more of the first through seventeenth aspects, process 800 further includes receiving (e.g., using reception component 1002), from the first IAB donor CU, information indicating a cell resource configuration of a cell served by the IAB node.

In a nineteenth aspect, alone or in combination with one or more of the first through eighteenth aspects, process 800 further includes receiving (e.g., using reception component 1002), from the first IAB donor CU, an acknowledgement that triggers a second connection between the IAB node and the second parent IAB node.

In a twentieth aspect, alone or in combination with one or more of the first through nineteenth aspects, process 800 further includes receiving (e.g., using reception component 1002), from the first IAB donor CU, information indicating a new resource configuration used by the IAB node on the first connection.

In a twenty-first aspect, alone or in combination with one or more of the first through twentieth aspects, process 800 further includes matching (e.g., using modification component 1010, depicted in FIG. 10) a resource configuration, for use on a second connection between the IAB node and the second parent IAB node, to the first resource configuration, and transmitting (e.g., using transmission component 1004), to the first IAB donor CU, an acknowledgement that triggers the second connection between the IAB node and the second parent IAB node.

In a twenty-second aspect, alone or in combination with one or more of the first through twenty-first aspects, process 800 further includes transmitting (e.g., using transmission component 1004), to the first IAB donor CU, information indicating the resource configuration used by the IAB node on the second connection.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
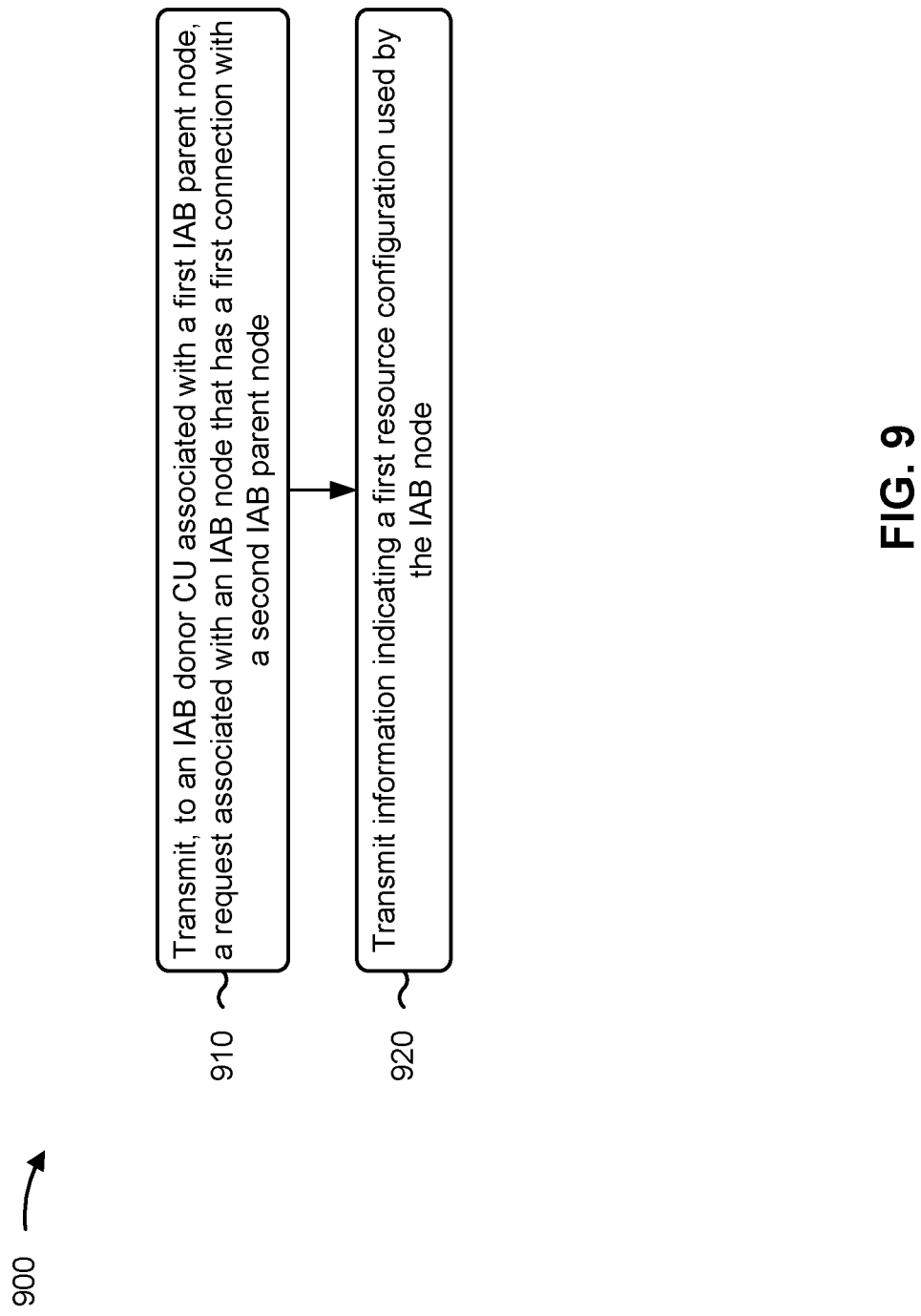

FIG. 9 is a diagram illustrating an example process 900 performed, for example, by a first network node, in accordance with the present disclosure. Example process 900 is an example where the first network node (e.g., second IAB donor CU 705*b* and/or apparatus 1000 of FIG. 10) performs operations associated with resource reporting for integrated access and backhaul radio access dual connectivity.

As shown in FIG. 9, in some aspects, process 900 may include transmitting, to a first IAB donor CU (e.g., first IAB donor CU 705*a* and/or apparatus 1000 of FIG. 10) that is associated with a first parent IAB node, a request associated with an IAB node (e.g., IAB node 715 of FIG. 7) that has a first connection with a second parent IAB node that is a child of the first network node (block 910). For example, the first network node (e.g., using transmission component 1004, depicted in FIG. 10) may transmit, to a first IAB donor CU that is associated with a first parent IAB node, a request associated with an IAB node that has a first connection with a second parent IAB node that is a child of the first network node, as described herein.

As further shown in FIG. 9, in some aspects, process 900 may include transmitting, to the first IAB donor CU, information indicating a first resource configuration used by the IAB node (block 920). For example, the first network node (e.g., using transmission component 1004) may transmit, to the first IAB donor CU, information indicating a first resource configuration used by the IAB node, as described herein.

Process 900 may include additional aspects, such as any single aspect or any combination of aspects described below and/or in connection with one or more other processes described elsewhere herein.

In a first aspect, the first network node includes a second IAB donor CU.

In a second aspect, alone or in combination with the first aspect, the IAB node includes an MT unit and a DU.

In a third aspect, alone or in combination with one or more of the first and second aspects, process 900 further includes transmitting (e.g., using transmission component 1004), to the first IAB donor CU, an acknowledgement that triggers a second connection between the IAB node and the first parent IAB node.

In a fourth aspect, alone or in combination with one or more of the first through third aspects, process 900 further includes determining (e.g., using determination component 1008, depicted in FIG. 10) that the first resource configuration is compatible with a second resource configuration used by the first parent IAB node, such that the acknowledgement is transmitted based at least in part on determining that the first resource configuration is compatible with the second resource configuration.

In a fifth aspect, alone or in combination with one or more of the first through fourth aspects, the IAB node uses a dual connectivity mode to establish the first connection and the second connection.

In a sixth aspect, alone or in combination with one or more of the first through fifth aspects, the first resource configuration indicates a union of resources used by the IAB node for MT communications and resources used by the IAB node for DU communications.

In a seventh aspect, alone or in combination with one or more of the first through sixth aspects, the first resource configuration indicates at least one resource used by the IAB node for MT communications.

In an eighth aspect, alone or in combination with one or more of the first through seventh aspects, the information further indicates a resource configuration used by the IAB node for DU communications, separately from the at least one resource used by the IAB node for MT communications.

In a ninth aspect, alone or in combination with one or more of the first through eighth aspects, the first resource configuration is for a cell served by the IAB node or for a child of the IAB node.

In a tenth aspect, alone or in combination with one or more of the first through ninth aspects, the information includes a cell resource configuration of a cell served by the IAB node, a configuration of synchronization signal transmissions associated with the cell, a channel state information reference signal configuration of the cell, a random access channel configuration of the cell, a scheduling request configuration of the cell, a downlink channel configuration for the cell, a subcarrier spacing for transmissions of the cell, at least part of a system information message associated with the cell, or a combination thereof.

In an eleventh aspect, alone or in combination with one or more of the first through tenth aspects, the information further indicates a multiplexing capability associated with the IAB node.

In a twelfth aspect, alone or in combination with one or more of the first through eleventh aspects, the multiplexing capability includes a multiplexing scheme between MT communications and DU communications of the IAB node.

In a thirteenth aspect, alone or in combination with one or more of the first through twelfth aspects, the multiplexing capability includes a multiplexing scheme between communications on the first connection and at least one of communications on a second connection between the IAB node and the first parent IAB node or DU communications of the IAB node.

In a fourteenth aspect, alone or in combination with one or more of the first through thirteenth aspects, process 900 further includes transmitting (e.g., using transmission component 1004), to the first IAB donor CU, information indicating a cell resource configuration of a cell served by the second parent IAB node of the IAB node.

In a fifteenth aspect, alone or in combination with one or more of the first through fourteenth aspects, process 900 further includes modifying (e.g., using modification component 1010, depicted in FIG. 10) a cell resource configuration of the cell served by the second parent IAB node of the IAB node based at least in part on the information.

In a sixteenth aspect, alone or in combination with one or more of the first through fifteenth aspects, process 900 further includes transmitting (e.g., using transmission component 1004), to the first IAB donor CU, information indicating a resource configuration to be used by the IAB node on a second connection with the first parent IAB node.

In a seventeenth aspect, alone or in combination with one or more of the first through sixteenth aspects, process 900 further includes transmitting (e.g., using transmission component 1004), to the first IAB donor CU, information indicating a resource configuration to be used by the IAB node on the first connection.

In an eighteenth aspect, alone or in combination with one or more of the first through seventeenth aspects, process 900 further includes receiving (e.g., using reception component 1002), from the first IAB donor CU, information indicating a resource configuration to be used by the IAB node on the first connection.

In a nineteenth aspect, alone or in combination with one or more of the first through eighteenth aspects, process 900 further includes transmitting (e.g., using transmission component 1004), to the first IAB donor CU, information indicating a cell resource configuration of a cell served by the IAB node.

In a twentieth aspect, alone or in combination with one or more of the first through nineteenth aspects, process 900 further includes receiving (e.g., using reception component 1002), from the first IAB donor CU, an acknowledgement that triggers a second connection between the IAB node and the first parent IAB node.

In a twenty-first aspect, alone or in combination with one or more of the first through twentieth aspects, process 900 further includes receiving (e.g., using reception component 1002), from the first IAB donor CU, information indicating a resource configuration used by the IAB node on the second connection.

In a twenty-second aspect, alone or in combination with one or more of the first through twenty-first aspects, process 900 further includes matching (e.g., using modification component 1010) a resource configuration, for use on a second connection between the IAB node and the first parent IAB node, to the first resource configuration, and receiving (e.g., using reception component 1002), to the first IAB donor CU, an acknowledgement that triggers the second connection between the IAB node and the second parent IAB node.

In a twenty-third aspect, alone or in combination with one or more of the first through twenty-second aspects, process 900 further includes transmitting (e.g., using transmission component 1004), to the first IAB donor CU, information indicating the resource configuration used by the IAB node on the first connection.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
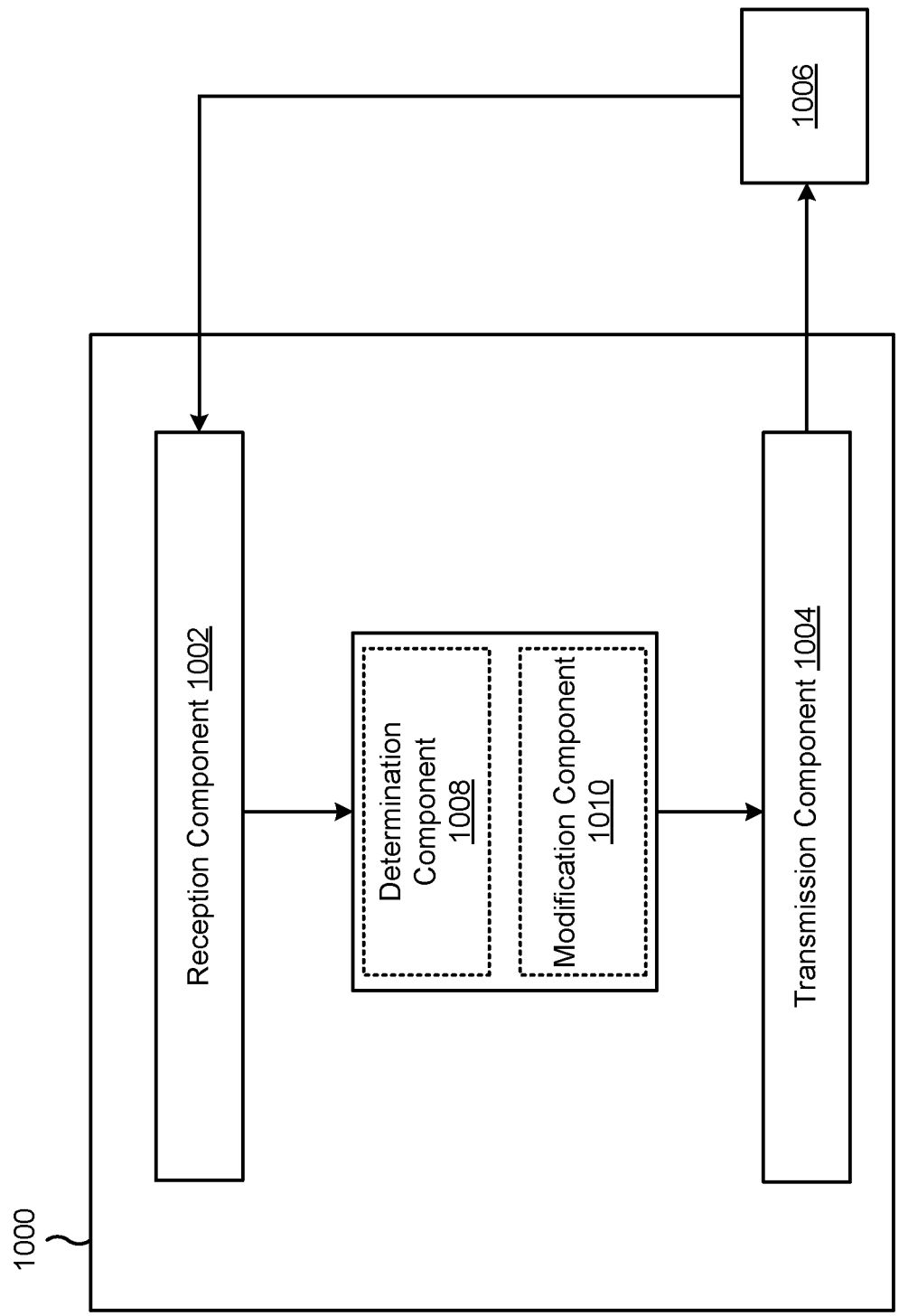
FIG. 10 is a diagram of an example apparatus for communication, in accordance with the present disclosure.

FIG. 10 is a diagram of an example apparatus 1000 for wireless communication. The apparatus 1000 may be a network node (such as an IAB donor CU), or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as another network node, another IAB donor CU, or another wireless communication device) using the reception component 1002 and the transmission component 1004. As further shown, the apparatus 1000 may include one or more of a determination component 1008 and/or a modification component 1010, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

In some aspects, apparatus 1000 may be a second IAB donor CU (e.g., second IAB donor CU 705b of FIG. 7). Accordingly, the reception component 1002 may receive, from the apparatus 1006 (e.g., first IAB donor CU 705a of FIG. 7), information indicating a first resource configuration used by an IAB node (e.g., IAB node 715 of FIG. 7) that has a first connection with a first parent IAB node that is a child of the first IAB donor CU. Accordingly, the transmission component 1004 may transmit, to a second parent IAB node that is a child of the first network node, the information.

In some aspects, the transmission component 1004 may transmit, to the apparatus 1006, an acknowledgement that triggers a second connection between the IAB node and the second parent IAB node. For example, the determination component 1008 may determine that the first resource configuration is compatible with a second resource configuration used by the second parent IAB node, such that the transmission component 1004 transmits the acknowledgement based at least in part on the determination component 1008 determining that the first resource configuration is compatible with the second resource configuration. The determination component 1008 may include a MIMO detector, a receive processor, a transmit MIMO processor, a transmit processor, a controller/processor, a memory, or a combination thereof, of the network node described in connection with FIG. 2.

In some aspects, the reception component 1002 may receive, from the apparatus 1006, information indicating a cell resource configuration of a cell served by the first parent IAB node of the IAB node. Additionally, or alternatively, the transmission component 1004 may transmit, to the apparatus 1006, information indicating a resource configuration to be used by the IAB node on a second connection with the second parent IAB node. Additionally, or alternatively, the transmission component 1004 may transmit, to the apparatus 1006, information indicating a resource configuration to be used by the IAB node on the first connection. Additionally, or alternatively, the reception component 1002 may receive, from the apparatus 1006, information indicating a resource configuration to be used by the IAB node on a second connection with the second parent IAB node. Additionally, or alternatively, the reception component 1002 may receive, from the apparatus 1006, information indicating a cell resource configuration of a cell served by the IAB node.

In some aspects, the reception component 1002 may receive, from the apparatus 1006, an acknowledgement that triggers a second connection between the IAB node and the second parent IAB node. Additionally, the reception component 1002 may receive, from the apparatus 1006, information indicating a new resource configuration used by the IAB node on the first connection.

In some aspects, the modification component 1010 may match a resource configuration, for use on a second connection between the IAB node and the second parent IAB node, to the first resource configuration. The modification component 1010 may include a modem, a MIMO detector, a receive processor, a transmit MIMO processor, a transmit processor, a controller/processor, a memory, or a combination thereof, of the network node described in connection with FIG. 2. Accordingly, the transmission component 1004 may transmit, to the apparatus 1006, an acknowledgement that triggers the second connection between the IAB node and the second parent IAB node. Additionally, in some aspects, the transmission component 1004 may transmit, to the apparatus 1006, information indicating the resource configuration used by the IAB node on the second connection.

As an alternative, apparatus 1000 may be a first IAB donor CU (e.g., IAB donor CU 705a of FIG. 7). Accordingly, the transmission component 1004 may transmit, to the apparatus 1006 (e.g., a second IAB donor CU 705b of FIG. 7 that is associated with a first parent IAB node), a request associated with an IAB node that has a first connection with a second parent IAB node that is a child of the first network node. Accordingly, the transmission component 1004 may transmit, to the apparatus 1006, information indicating a first resource configuration used by the IAB node.

In some aspects, the transmission component 1004 may transmit, to the apparatus 1006, an acknowledgement that triggers a second connection between the IAB node and the first parent IAB node. For example, the determination component 1008 may determine that the first resource configuration is compatible with a second resource configuration used by the first parent IAB node, such that the transmission component 1004 transmits the acknowledgement based at least in part on the determination component 1008 determining that the first resource configuration is compatible with the second resource configuration.

In some aspects, the transmission component 1004 may transmit, to the apparatus 1006, information indicating a cell resource configuration of a cell served by the second parent IAB node of the IAB node. In some aspects, the modification component 1010 may modify a cell resource configuration of the cell served by the second parent IAB node of the IAB node based at least in part on the information. Additionally, or alternatively, the transmission component 1004 may transmit, to the apparatus 1006, information indicating a resource configuration to be used by the IAB node on a second connection with the first parent IAB node. Additionally, or alternatively, the transmission component 1004 may transmit, to the apparatus 1006, information indicating a resource configuration to be used by the IAB node on the first connection. Additionally, or alternatively, the reception component 1002 may receive, from the apparatus 1006, information indicating a resource configuration to be used by the IAB node on the first connection. Additionally, or alternatively, the transmission component 1004 may transmit, to the apparatus 1006, information indicating a cell resource configuration of a cell served by the IAB node.

In some aspects, the reception component 1002 may receive, from the apparatus 1006, an acknowledgement that triggers a second connection between the IAB node and the first parent IAB node. Accordingly, the reception component 1002 may receive, from the apparatus 1006, information indicating a resource configuration used by the IAB node on the second connection.

In some aspects, the modification component 1010 may match a resource configuration, for use on a second connection between the IAB node and the first parent IAB node, to the first resource configuration. Accordingly, the reception component 1002 may receive, from the apparatus 1006, an acknowledgement that triggers the second connection between the IAB node and the second parent IAB node. Additionally, in some aspects, the transmission component 1004 may transmit, to the apparatus 1006, information indicating the resource configuration used by the IAB node on the first connection.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first network node, comprising: receiving, from a first integrated access and backhaul (IAB) donor central unit (CU), information indicating a first resource configuration used by an IAB node that has a first connection with a first parent IAB node that is a child of the first IAB donor CU; and transmitting, to a second parent IAB node that is a child of the first network node, the information.

Aspect 2: The method of Aspect 1, wherein the first network node comprises a second IAB donor CU.

Aspect 3: The method of any of Aspects 1 through 2, wherein the IAB node includes a mobile termination (MT) unit and a distributed unit (DU).

Aspect 4: The method of any of Aspects 1 through 3, further comprising: transmitting, to the first IAB donor CU, an acknowledgement that triggers a second connection between the IAB node and the second parent IAB node.

Aspect 5: The method of Aspect 4, further comprising: determining that the first resource configuration is compatible with a second resource configuration used by the second parent IAB node, wherein the acknowledgement is transmitted based at least in part on determining that the first resource configuration is compatible with the second resource configuration.

Aspect 6: The method of any of Aspects 4 through 5, wherein the IAB node uses a dual connectivity mode to establish the first connection and the second connection.

Aspect 7: The method of any of Aspects 1 through 6, wherein the first resource configuration indicates a union of resources used by the IAB node for mobile termination (MT) communications and resources used by the IAB node for distributed unit (DU) communications.

Aspect 8: The method of any of Aspects 1 through 6, wherein the first resource configuration indicates at least one resource used by the IAB node for mobile termination (MT) communications.

Aspect 9: The method of Aspect 8, wherein the information further indicates a resource configuration used by the IAB node for distributed unit (DU) communications, separately from the at least one resource used by the IAB node for MT communications.

Aspect 10: The method of any of Aspects 1 through 9, wherein the first resource configuration is for a cell served by the IAB node or for a child of the IAB node.

Aspect 11: The method of any of Aspects 1 through 10, wherein the information includes: a cell resource configuration of a cell served by the IAB node, a configuration of synchronization signal transmissions associated with the cell, a channel state information reference signal configuration of the cell, a random access channel configuration of the cell, a scheduling request configuration of the cell, a downlink channel configuration for the cell, a subcarrier spacing for transmissions of the cell, at least part of a system information message associated with the cell, or a combination thereof.

Aspect 12: The method of any of Aspects 1 through 11, wherein the information further indicates a multiplexing capability associated with the IAB node.

Aspect 13: The method of Aspect 12, wherein the multiplexing capability includes a multiplexing scheme between mobile termination (MT) communications and distributed unit (DU) communications of the IAB node.

Aspect 14: The method of Aspect 12, wherein the multiplexing capability includes a multiplexing scheme between communications on a second connection between the IAB node and the second parent IAB node and at least one of communications on the first connection or distributed unit (DU) communications of the IAB node.

Aspect 15: The method of any of Aspects 1 through 14, further comprising: receiving, from the first IAB donor CU, information indicating a cell resource configuration of a cell served by the first parent IAB node of the IAB node.

Aspect 16: The method of any of Aspects 1 through 15, further comprising: transmitting, to the first IAB donor CU, information indicating a resource configuration to be used by the IAB node on a second connection with the second parent IAB node.

Aspect 17: The method of any of Aspects 1 through 16, further comprising: transmitting, to the first IAB donor CU, information indicating a resource configuration to be used by the IAB node on the first connection.

Aspect 18: The method of any of Aspects 1 through 17, further comprising: receiving, from the first IAB donor CU, information indicating a resource configuration to be used by the IAB node on a second connection with the second parent IAB node.

Aspect 19: The method of any of Aspects 1 through 18, further comprising: receiving, from the first IAB donor CU, information indicating a cell resource configuration of a cell served by the IAB node.

Aspect 20: The method of any of Aspects 1 through 19, further comprising: receiving, from the first IAB donor CU, an acknowledgement that triggers a second connection between the IAB node and the second parent IAB node.

Aspect 21: The method of Aspect 20, further comprising: receiving, from the first IAB donor CU, information indicating a new resource configuration used by the IAB node on the first connection.

Aspect 22: The method of any of Aspects 1 through 19, further comprising: matching a resource configuration, for use on a second connection between the IAB node and the second parent IAB node, to the first resource configuration; and transmitting, to the first IAB donor CU, an acknowledgement that triggers the second connection between the IAB node and the second parent IAB node.

Aspect 23: The method of Aspect 22, further comprising: transmitting, to the first IAB donor CU, information indicating the resource configuration used by the IAB node on the second connection.

Aspect 24: A method of wireless communication performed by a first network node, comprising: receiving, from a first integrated access and backhaul (IAB) donor central unit (CU) that is associated with a first parent IAB node, a request associated with an IAB node that has a first connection with a second parent IAB node that is a child of the first network node; and transmitting, to the first IAB donor CU, information indicating a first resource configuration used by the IAB node.

Aspect 25: The method of Aspect 24, wherein the first network node comprises a second IAB donor CU.

Aspect 26: The method of any of Aspects 24 through 25, wherein the IAB node includes a mobile termination (MT) unit and a distributed unit (DU).

Aspect 27: The method of any of Aspects 24 through 26, further comprising: transmitting, to the first IAB donor CU, an acknowledgement that triggers a second connection between the IAB node and the first parent IAB node.

Aspect 28: The method of Aspect 27, further comprising: determining that the first resource configuration is compatible with a second resource configuration used by the first parent IAB node, wherein the acknowledgement is transmitted based at least in part on determining that the first resource configuration is compatible with the second resource configuration.

Aspect 29: The method of any of Aspects 27 through 28, wherein the IAB node uses a dual connectivity mode to establish the first connection and the second connection.

Aspect 30: The method of any of Aspects 24 through 29, wherein the first resource configuration indicates a union of resources used by the IAB node for mobile termination (MT) communications and resources used by the IAB node for distributed unit (DU) communications.

Aspect 31: The method of any of Aspects 24 through 29, wherein the first resource configuration indicates at least one resource used by the IAB node for mobile termination (MT) communications.

Aspect 32: The method of Aspect 31, wherein the information further indicates a resource configuration used by the IAB node for distributed unit (DU) communications, separately from the at least one resource used by the IAB node for MT communications.

Aspect 33: The method of any of Aspects 24 through 32, wherein the first resource configuration is for a cell served by the IAB node or for a child of the IAB node.

Aspect 34: The method of any of Aspects 24 through 33, wherein the information includes: a cell resource configuration of a cell served by the IAB node, a configuration of synchronization signal transmissions associated with the cell, a channel state information reference signal configuration of the cell, a random access channel configuration of the cell, a scheduling request configuration of the cell, a downlink channel configuration for the cell, a subcarrier spacing for transmissions of the cell, at least part of a system information message associated with the cell, or a combination thereof.

Aspect 35: The method of any of Aspects 24 through 34, wherein the information further indicates a multiplexing capability associated with the IAB node.

Aspect 36: The method of Aspect 35, wherein the multiplexing capability includes a multiplexing scheme between mobile termination (MT) communications and distributed unit (DU) communications of the IAB node.

Aspect 37: The method of Aspect 35, wherein the multiplexing capability includes a multiplexing scheme between communications on the first connection and at least one of communications on a second connection between the IAB node and the first parent IAB node or distributed unit (DU) communications of the IAB node.

Aspect 38: The method of any of Aspects 24 through 37, further comprising: transmitting, to the first IAB donor CU, information indicating a cell resource configuration of a cell served by the second parent IAB node of the IAB node.

Aspect 39: The method of Aspect 38, further comprising: modifying the cell resource configuration of the cell served by the second parent IAB node of the IAB node based at least in part on the information.

Aspect 40: The method of any of Aspects 24 through 39, further comprising: transmitting, to the first IAB donor CU, information indicating a resource configuration to be used by the IAB node on a second connection with the first parent IAB node.

Aspect 41: The method of any of Aspects 24 through 40, further comprising: transmitting, to the first IAB donor CU, information indicating a resource configuration to be used by the IAB node on the first connection.

Aspect 42: The method of any of Aspects 24 through 41, further comprising: receiving, from the first IAB donor CU, information indicating a resource configuration to be used by the IAB node on the first connection.

Aspect 43: The method of any of Aspects 24 through 42, further comprising: transmitting, to the first IAB donor CU, information indicating a cell resource configuration of a cell served by the IAB node.

Aspect 44: The method of any of Aspects 24 through 43, further comprising: receiving, from the first IAB donor CU, an acknowledgement that triggers a second connection between the IAB node and the first parent IAB node.

Aspect 45: The method of Aspect 44, further comprising: receiving, from the first IAB donor CU, information indicating a resource configuration used by the IAB node on the second connection.

Aspect 46: The method of any of Aspects 24 through 43, further comprising: matching a resource configuration, for use on a second connection between the IAB node and the first parent IAB node, to the first resource configuration; and receiving, from the first IAB donor CU, an acknowledgement that triggers the second connection between the IAB node and the second parent IAB node.

Aspect 47: The method of Aspect 46, further comprising: transmitting, to the first IAB donor CU, information indicating the resource configuration used by the IAB node on the first connection.

Aspect 48: An apparatus for communication at a device, comprising a processor; memory coupled with the processor; and instructions stored in the memory and executable by the processor to cause the apparatus to perform the method of one or more of Aspects 1-23.

Aspect 49: A device for communication, comprising a memory and one or more processors coupled to the memory, the one or more processors configured to perform the method of one or more of Aspects 1-23.

Aspect 50: An apparatus for communication, comprising at least one means for performing the method of one or more of Aspects 1-23.

Aspect 51: A non-transitory computer-readable medium storing code for communication, the code comprising instructions executable by a processor to perform the method of one or more of Aspects 1-23.

Aspect 52: A non-transitory computer-readable medium storing a set of instructions for communication, the set of instructions comprising one or more instructions that, when executed by one or more processors of a device, cause the device to perform the method of one or more of Aspects 1-23.

Aspect 53: An apparatus for communication at a device, comprising a processor; memory coupled with the processor; and instructions stored in the memory and executable by the processor to cause the apparatus to perform the method of one or more of Aspects 24-47.

Aspect 54: A device for communication, comprising a memory and one or more processors coupled to the memory, the one or more processors configured to perform the method of one or more of Aspects 24-47.

Aspect 55: An apparatus for communication, comprising at least one means for performing the method of one or more of Aspects 24-47.

Aspect 56: A non-transitory computer-readable medium storing code for communication, the code comprising instructions executable by a processor to perform the method of one or more of Aspects 24-47.

Aspect 57: A non-transitory computer-readable medium storing a set of instructions for communication, the set of instructions comprising one or more instructions that, when executed by one or more processors of a device, cause the device to perform the method of one or more of Aspects 24-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for communication at a first network node, comprising:
    a processing system that includes processor circuitry and memory circuitry that stores code, the processing system configured to cause the first network node to:
        receive, from a first integrated access and backhaul (IAB) donor central unit (CU), information indicating a first resource configuration used by an IAB node that has a first connection with a first parent IAB node and a second connection with a second parent IAB node;
        transmit, to the second parent IAB node, the information indicating the first resource configuration; and
        transmit, to the first IAB donor CU, information indicating a resource configuration to be used by the IAB node on the second connection.

2. The apparatus of claim 1, wherein the processing system is further configured to cause the first network node to:
    transmit, to the first IAB donor CU, an acknowledgement that triggers the second connection.

3. The apparatus of claim 2, wherein the processing system is further configured to cause the first network node to:
    determine that the first resource configuration is compatible with a second resource configuration used by the second parent IAB node,
    wherein the processing system, to cause the first network node to transmit the acknowledgement is configured to cause the first network node to:
        transmit the acknowledgement based at least in part on the first resource configuration being compatible with the second resource configuration.

4. The apparatus of claim 1, wherein the first resource configuration is for a cell served by the IAB node or for a child of the IAB node.

5. The apparatus of claim 1, wherein the information indicating the first resource configuration includes:
    a cell resource configuration of a cell served by the IAB node,
    a configuration of synchronization signal transmissions associated with the cell, a channel state information reference signal configuration of the cell,
a random access channel configuration of the cell,
a scheduling request configuration of the cell,
a downlink channel configuration for the cell,
a subcarrier spacing for transmissions of the cell,
at least part of a system information message associated with the cell, or
a combination thereof.

6. The apparatus of claim 1, wherein the information indicating the first resource configuration further indicates a multiplexing capability associated with the IAB node.

7. The apparatus of claim 6, wherein the multiplexing capability includes a multiplexing scheme between mobile termination (MT) communications and distributed unit (DU) communications of the IAB node.

8. The apparatus of claim 6, wherein the multiplexing capability includes a multiplexing scheme between communications on the second connection and at least one of communications on the first connection or distributed unit (DU) communications of the IAB node.

9. The apparatus of claim 1, wherein the processing system is further configured to cause the first network node to:
receive, from the first IAB donor CU, information indicating a cell resource configuration of a cell served by the first parent IAB node.

10. The apparatus of claim 1, wherein the processing system is further configured to cause the first network node to:
transmit, to the first IAB donor CU, information indicating a resource configuration to be used by the IAB node on the first connection.

11. The apparatus of claim 1, wherein the processing system is further configured to cause the first network node to:
receive, from the first IAB donor CU, the information indicating the resource configuration to be used by the IAB node on the second connection.

12. The apparatus of claim 1, wherein the processing system is further configured to cause the first network node to:
receive, from the first IAB donor CU, information indicating a new resource configuration used by the IAB node on the first connection.

13. The apparatus of claim 1, wherein the processing system is further configured to cause the first network node to:
match the resource configuration to be used on the second connection to the first resource configuration; and
transmit, to the first IAB donor CU, an acknowledgement that triggers the second connection.

14. The apparatus of claim 1, wherein the first parent IAB node is a child of the first IAB donor CU.

15. The apparatus of claim 1, wherein the second parent IAB node is a child of the first network node.

16. An apparatus for communication at a first network node, comprising:
a processing system that includes processor circuitry and memory circuitry that stores code, the processing system configured to cause the first network node to:
transmit, to a first integrated access and backhaul (IAB) donor central unit (CU) that is associated with a first parent IAB node, a request associated with an IAB node that has a first connection with the first parent IAB node and a second connection with a second parent IAB node;
transmit, to the first IAB donor CU, information indicating a first resource configuration used by the IAB node; and
transmit, to the first IAB donor CU, information indicating a resource configuration to be used by the IAB node on the second connection.

17. The apparatus of claim 16, wherein the processing system is further configured to cause the first network node to:
receive, from the first IAB donor CU, an acknowledgement that triggers the first connection.

18. The apparatus of claim 17, wherein the processing system is further configured to cause the first network node to:
determine that the first resource configuration is compatible with a second resource configuration used by the first parent IAB node,
wherein the processing system, to cause the first network node to receive the acknowledgement, is configured to cause the first network node to:
receive the acknowledgment based at least in part on the first resource configuration being compatible with the second resource configuration.

19. The apparatus of claim 16, wherein the information indicating the first resource configuration includes:
a cell resource configuration of a cell served by the IAB node,
a configuration of synchronization signal transmissions associated with the cell,
a channel state information reference signal configuration of the cell,
a random access channel configuration of the cell,
a scheduling request configuration of the cell,
a downlink channel configuration for the cell,
a subcarrier spacing for transmissions of the cell,
at least part of a system information message associated with the cell, or
a combination thereof.

20. The apparatus of claim 16, wherein the information indicating the first resource configuration further indicates a multiplexing capability associated with the IAB node.

21. The apparatus of claim 16, wherein the processing system is further configured to cause the first network node to:
transmit, to the first IAB donor CU, information indicating a cell resource configuration of a cell served by the second parent IAB node.

22. The apparatus of claim 21, wherein the processing system is further configured to cause the first network node to:
modify the cell resource configuration of the cell served by the second parent IAB node based at least in part on the information indicating the first resource configuration.

23. The apparatus of claim 16, wherein the processing system is further configured to cause the first network node to:
transmit, to the first IAB donor CU, information indicating a resource configuration to be used by the IAB node on the first connection.

24. The apparatus of claim 16, wherein the processing system is further configured to cause the first network node to:
receive, from the first IAB donor CU, the information indicating the resource configuration to be used by the IAB node on the second connection.

25. The apparatus of claim 24, wherein the processing system is further configured to cause the first network node to:
- receive, from the first IAB donor CU, information indicating a resource configuration used by the IAB node on the first connection.

26. The apparatus of claim 16, wherein the processing system is further configured to cause the first network node to:
- match a resource configuration, for use on the first connection, to the first resource configuration; and
- receive, from the first IAB donor CU, an acknowledgement that triggers the second connection.

27. The apparatus of claim 16, wherein the second parent IAB node is a child of the first network node.

28. The apparatus of claim 16, wherein the first parent IAB node is a child of the first IAB donor CU.

29. A method of wireless communication performed by a first network node, comprising:
- receiving, from a first integrated access and backhaul (IAB) donor central unit (CU), information indicating a first resource configuration used by an IAB node that has a first connection with a first parent IAB node and a second connection with a second parent IAB node;
- transmitting, to the second parent IAB node, the information indicating the first resource configuration; and
- transmitting, to the first IAB donor CU, information indicating a resource configuration to be used by the IAB node on the second connection.

30. A method of wireless communication performed by a first network node, comprising:
- transmitting, to a first integrated access and backhaul (IAB) donor central unit (CU) that is associated with a first parent IAB node, a request associated with an IAB node that has a first connection with the first parent IAB node and a second connection with a second parent IAB node;
- transmitting, to the first IAB donor CU, information indicating a first resource configuration used by the IAB node; and
- transmitting, to the first IAB donor CU, information indicating a resource configuration to be used by the IAB node on the second connection.

* * * * *